United States Patent
Vranish

(10) Patent No.: US 7,544,146 B2
(45) Date of Patent: *Jun. 9, 2009

(54) ANTI-BACKLASH GEAR BEARINGS

(75) Inventor: John M. Vranish, Crofton, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/122,201

(22) Filed: May 2, 2005

(65) Prior Publication Data

US 2006/0073933 A1 Apr. 6, 2006

Related U.S. Application Data

(63) Continuation-in-part of application No. 10/675,599, filed on Sep. 29, 2003, now abandoned.

(51) Int. Cl.
*F16H 57/08* (2006.01)

(52) U.S. Cl. ....................... 475/344; 475/335

(58) Field of Classification Search ................ 475/335, 475/344, 248–250, 252; 74/437, 440, 457–466
See application file for complete search history.

(56) References Cited

U.S. PATENT DOCUMENTS

| | | | | | |
|---|---|---|---|---|---|
| 1,901,194 | A | * | 3/1933 | Salerni | 475/286 |
| 1,970,251 | A | * | 8/1934 | Rossman | 475/335 |
| 3,330,171 | A | * | 7/1967 | Nasvytis | 475/334 |
| 3,406,593 | A | * | 10/1968 | Vessey | 475/249 |
| 3,789,700 | A | * | 2/1974 | Cotreau et al. | 74/640 |
| 5,293,107 | A | * | 3/1994 | Akeel | 318/568.11 |
| 5,529,547 | A | * | 6/1996 | Okuda et al. | 475/249 |

* cited by examiner

*Primary Examiner*—Tisha D Lewis
(74) *Attorney, Agent, or Firm*—Matthew F. Johnston

(57) ABSTRACT

A gear bearing having a first gear and a second gear, each having a plurality of teeth. Each gear operates on two non-parallel surfaces of the opposing gear teeth to perform both gear and bearing functions simultaneously. The gears are moving at substantially the same speed at their contact points. The gears may be roller gear bearings or phase-shifted gear bearings, and may be arranged in a planet/sun system or used as a transmission. One preferred embodiment discloses and describes an anti-backlash feature to counter "dead zones" in the gear bearing movement.

27 Claims, 17 Drawing Sheets

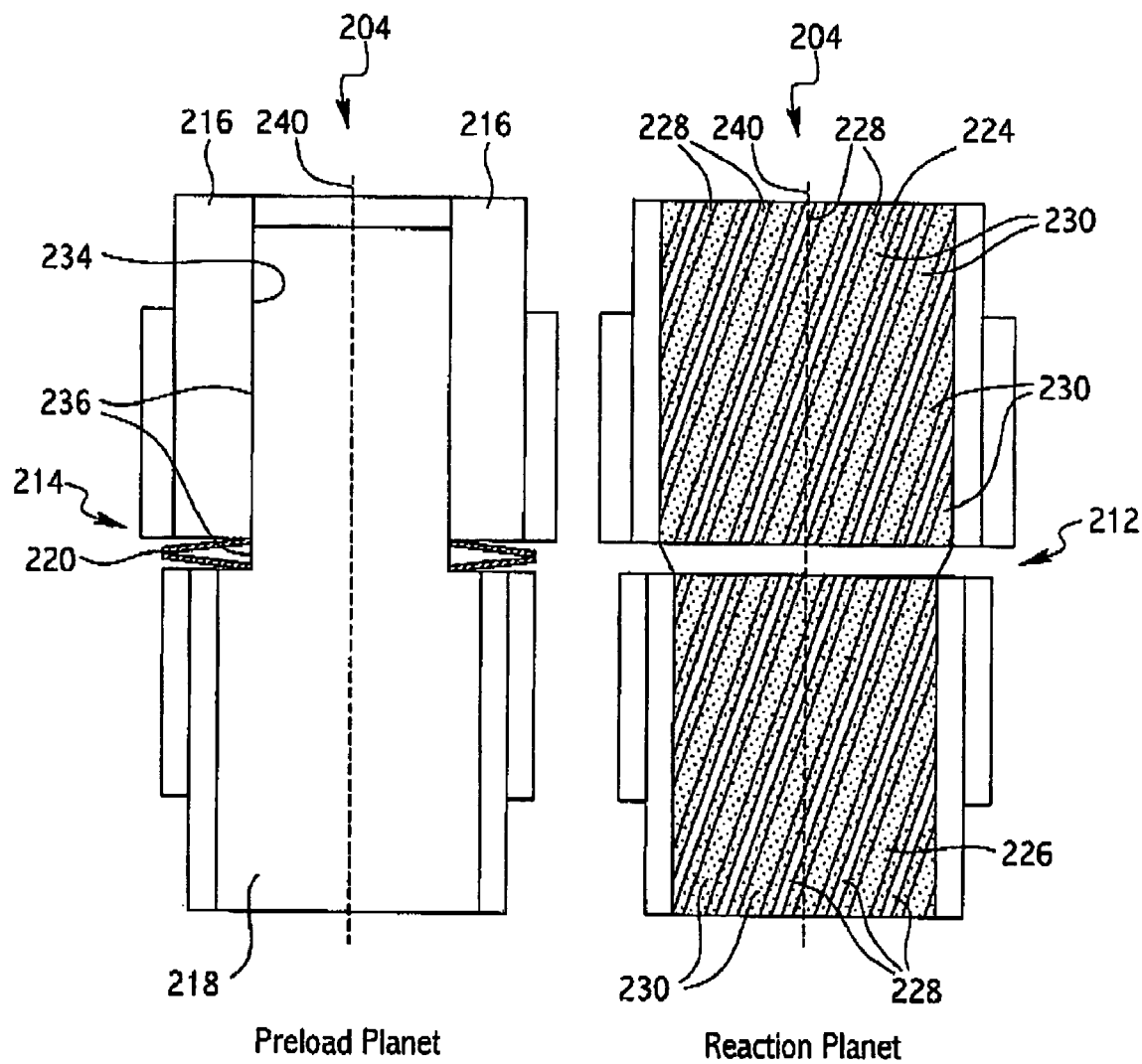
FIG. 14A  Preload Planet
FIG. 14B  Reaction Planet

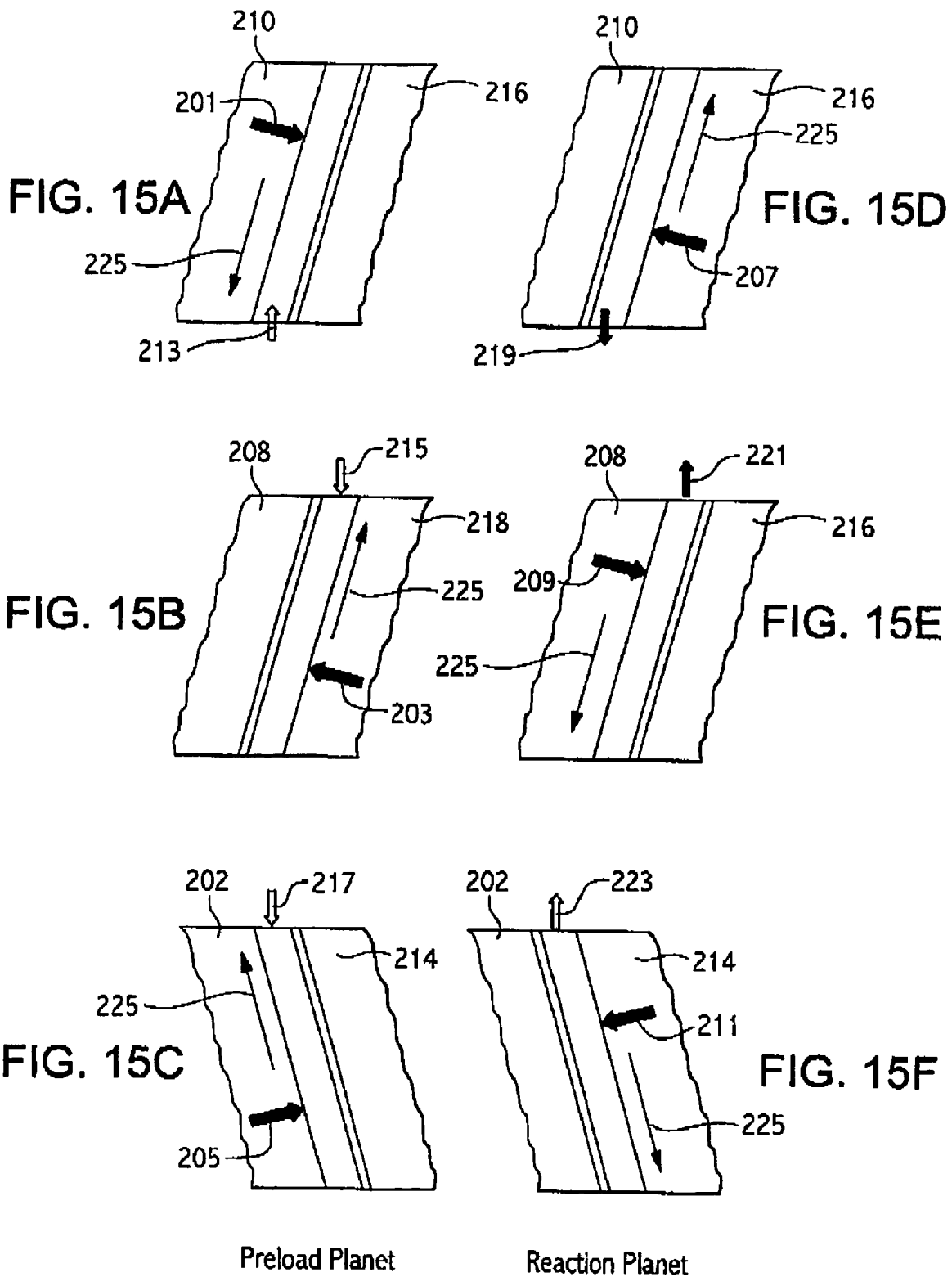

Planet Locking Forces

ANTI-BACKLASH GEAR BEARINGS

RELATED U.S. APPLICATION DATA

This patent application is a continuation-in-part of U.S. patent application. Ser. No. 10/675,599 filed on Sep. 29, 2003, now abandoned, which is a continuation of U.S. Pat. No. 6,626,792.

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

1. Field of the Invention

The present invention relates to a novel gear bearing having components that perform both gear and bearing functions in a single component using two non-parallel surfaces simultaneously, including an embodiment which is designed to substantially eliminate backlash associated with all gear systems.

2. Description of the Related Art

A first known planetary gear system uses helical planetary gears with two sets of ball bearings and drives its output off a carrier. In driving off the carrier, mechanical advantage and efficiency are sacrificed. The two sets of ball bearings locate and stabilize the operation of the gears. This arrangement takes up space and the interfaces make for a weaker system. By using two, or even one separate bearing, separate interfaces require a separate attachment/detachment means which tends to rattle and is so flexible that the structure is weakened.

A second known design involves harmonic drives. Harmonic drives come in two main types, a pancake type (short axial length) and a cup type (with a larger axial length). Harmonic drives operate by means of a wave generator which rotates and, in so doing, periodically pushes a flexible spline (with teeth) radially outward in two diametrically opposite places. As the spline deflects outwards, its teeth push against the sides of the teeth of the output ring, causing the output ring to move to one side. As the wave generator turns, the points of the flexible spline turn with it, and the output ring moves with it also. There is generally one less tooth in the output ring than in the flex spline, so as the flex spline makes a complete cycle, the output ring rotates a total width of two teeth. The pancake version is not as easy to lubricate and is not as efficient as the cup type, though they are more compact. The cup type is more efficient but is not as compact. Both types are expensive and structurally weak, and the flexible splines tend to fail due to stripping.

A third known design is disclosed in U.S. Pat. No. 5,409,431, involving Carrier-Less, Anti-Backlash Planetary Drive System (Apr. 25, 1995, by John M. Vranish). While an anti-backlash feature is desirable to minimize "dead zones," this system is unduly bulky, too complicated and very expensive to manufacture. Therefore, there remains in the prior art a need for gear bearings that exhibit a more straightforward, streamlined design, as well as an anti-backlash feature.

SUMMARY OF THE INVENTION

Accordingly, it is an object of the present invention to provide a gear bearing system that overcomes the above disadvantages of the known designs.

It is a further object of the present invention to provide a gear bearing system that results in a high mechanical advantage.

It is yet another object of the present invention to provide a gear bearing system that has improved efficiency, strength and structural rigidity.

It is still another object of the present invention to provide a gear bearing system that has a simpler construction and lower parts count.

It is another object of the present invention to provide a gear bearing system that is superior in bearing strength.

It is another object of the present invention to provide a gear bearing system in which it is easy to assemble, locate and stabilize gear systems.

It is still another object of the present invention to provide a gear bearing system common to both the electric motor drive in order to allow the armature and stator to function properly, and to provide a high mechanical advantage output.

An embodiment of the present invention includes a system including a component that performs both gear and bearing functions in a single component using two or more orthogonal surfaces simultaneously. In another embodiment, this system includes roller gear bearings, and in another embodiment, this system includes phase-shifted gear bearings. In a third embodiment, the bearings are helical.

The foregoing objects of the invention are further achieved by a fixed ratio transmission based on gear bearings.

The foregoing objects of the invention may also be achieved by a gear bearing system comprising a first gear having a plurality of first gear teeth comprising a first plurality of contact points, each of said first plurality of contact points moving at a first speed, and a second gear having a second plurality of gear teeth comprising a second plurality of contact points, each of said second plurality of contact points moving at a second speed. The first plurality of contact points and second plurality of contact points are in contact with each other and the first speed is substantially the same as the second speed.

The foregoing objects of the invention are still further achieved by a gear bearing system comprising a first gear having a plurality of first gear teeth, each of the first gear teeth having a first surface and a second surface, and a second gear operating on the first surface and second surface of the first gear teeth.

Another embodiment of the invention includes an anti-backlash feature in which a planetary gear bearing transmission includes two different types of planetary gear bearings. The first type is solid, while the second type is split and includes top and bottom halves, which are continuously biased outwardly or away from each other. Preferably, the solid and split planetary gear bearings are placed alternately about a sun gear.

Additional objects and advantages of the invention will be set forth in part in the description which follows, and, in part, will be obvious from the description, or may be learned from practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 14A is partial cross-sectional view of a preload (split) planet gear of the embodiment of FIG. 13A.

FIG. 14B is a partial cross-sectional view of a reaction (solid) planet gear of the embodiment of FIG. 13A.

FIGS. 15A-15F are partial cutaway views of planet gears of the embodiment of FIG. 13A illustrating forces acting thereon.

DETAILED DESCRIPTION

Figure 1:
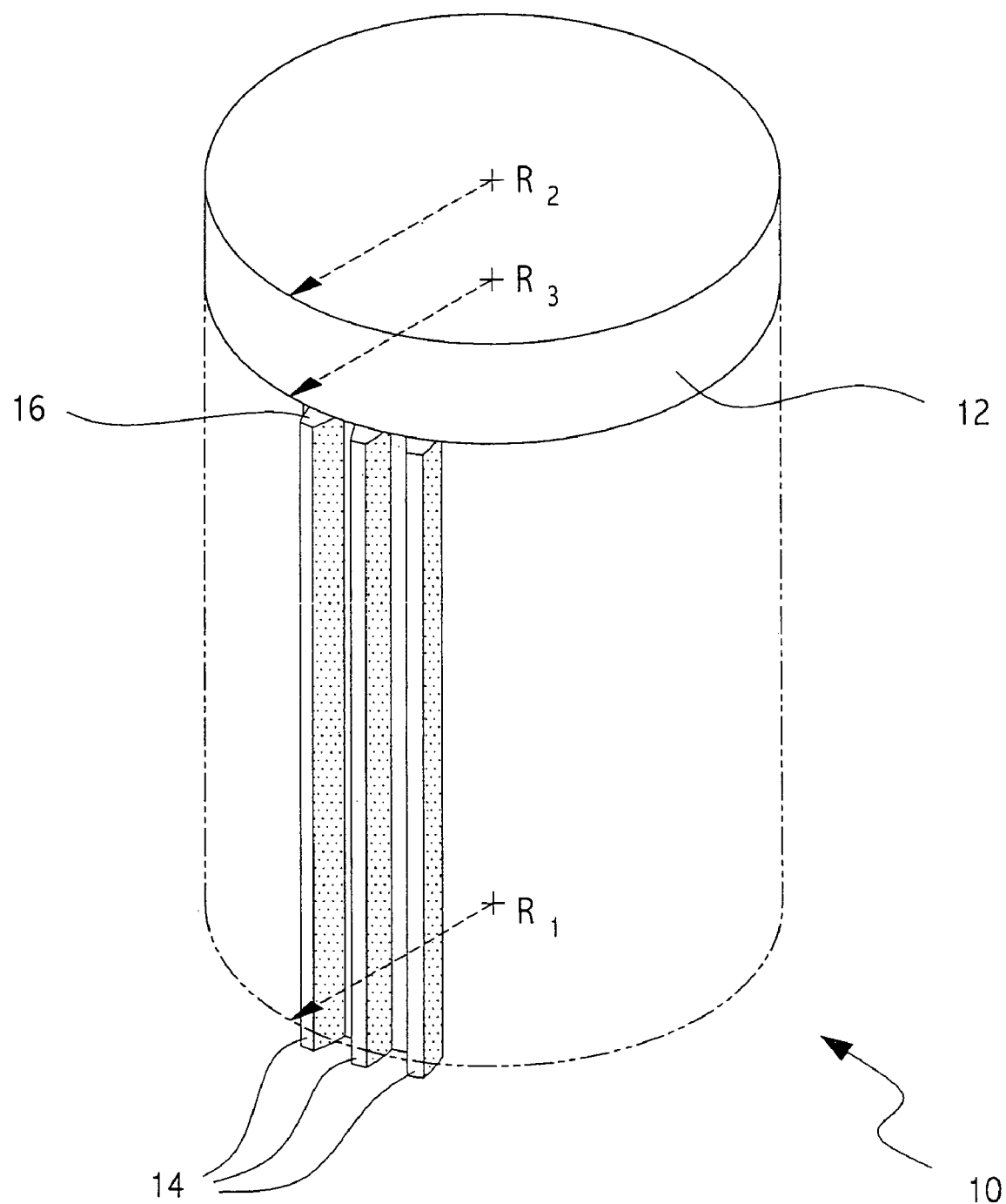
FIG. 1 is a perspective view of a spur gear as used in a first embodiment of the present invention.

Reference will now be made in detail to the present preferred embodiments of the present invention, examples of which are illustrated in the accompanying drawings, wherein like reference numerals refer to like elements throughout.

As illustrated in FIGS. 1, 2 and 3, a first embodiment of the present invention relates to spur roller gear bearings. Referring to FIG. 1, spur roller gear bearings consist of a spur gear 10 which has a roller 12 coaxially mounted on its top. Spur gear teeth 14 extend radially from spur gear 10, and have a pitch radius $R_1$. The radius of the roller $R_2$ is substantially equal to the pitch radius $R_1$ of the spur gear teeth. The tops of the spur gear teeth 14 form a crown 16. The radius to the crown top $R_3$ is equal to the pitch radius and the roller radius. Since $R_1$, $R_2$ and $R_3$ are substantially equal, the points at these radii move at substantially the same speed.

Figure 2A:
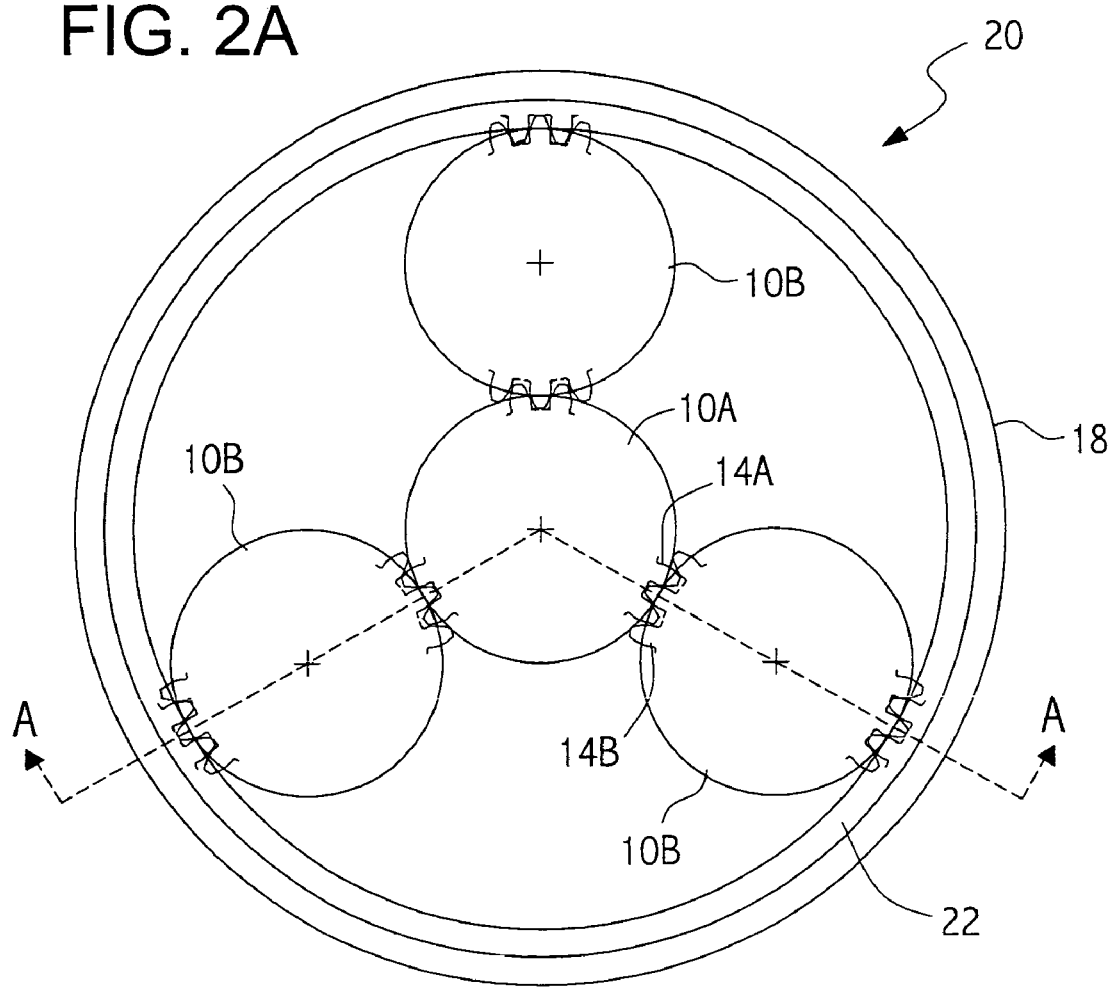
FIG. 2A is an overhead view of a planetary system using the spur gears of the first embodiment of the present invention.

Referring now to FIG. 2A, we see that spur gears 10 can be configured with a ring gear 18 formed of ring gear teeth 24 to form planetary system 20. Planet spur gears 10B revolve around sun spur gear 10A. The spur gears 10A, B are shown here to be identical in size, however, one skilled in the art will recognize that sun spur 10A may be of a different size, i.e. radius, than the planets 10B without effecting the scope of this invention. At any rate, the instantaneous speed at $R_1$, $R_2$, and $R_3$ is substantially identical for each spur gear 10A, B. The crown 16 of each planet spur gear 10B interfaces with the roller 12 of a sun spur gear 10A, and vice versa. The teeth 14B of each planet gear 10B also interface with the teeth 14A of the sun gear 10A. Specifically, the teeth 14A, B contact each other at pitch radius $R_1$.

Figure 2B:
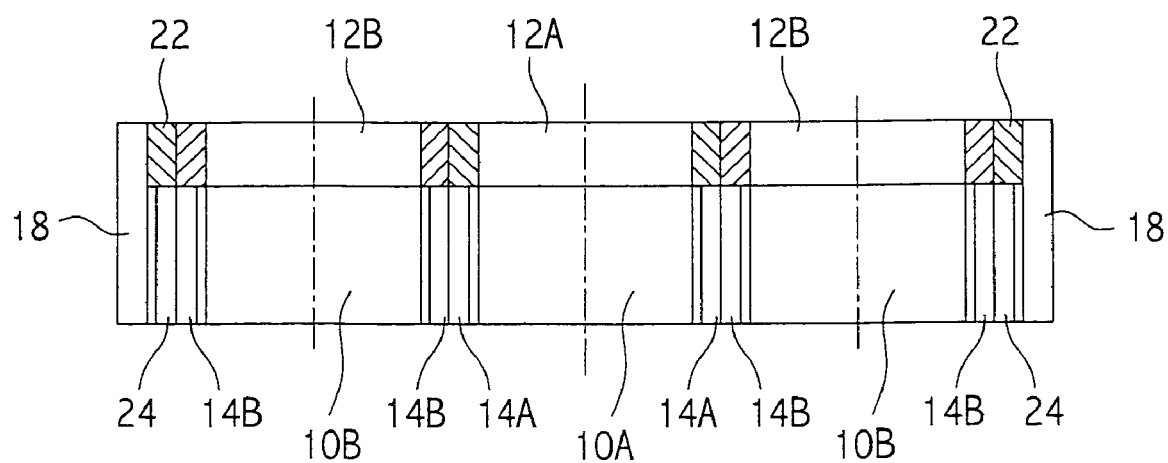
FIG. 2B is a cross-sectional view taken through line A-A of FIG. 2A.

Referring to FIG. 2B, which is a cross-section of the planetary system 20 of FIG. 2A, we see that a ring roller 22 is coaxially mounted on the top of the ring gear 18 such that the diameter of the ring roller 18 is set equal to the pitch diameter of the ring gear teeth 24. The tops of the ring gear teeth 24 are crowned at (not shown) the point where they interface with the spur gear teeth 14B.

This planetary system 20 is held together without further structures. As can be seen from FIGS. 2A and 2B, if a planet spur gear 10B is pushed down, its teeth 14B will slide with respect to ring gear 18 and the sun spur gear teeth 14A, but the planet spur gear roller 12B will be blocked by the upper surface of the ring gear teeth 24. If planet spur gear 10B is pushed upwards, the ring roller 22 will block the upper surface of the planet spur gear teeth 14B. If the sun spur gear 10A is pushed down, sun spur gear roller 12A will be blocked by the upper surface of each of the three planet spur gears 10B, so that the planet spur gears 10B will likewise be pushed down. However, planet spur gears 10B will each, in turn, be blocked by the ring gear 18 so, ultimately, the sun spur gear 10A cannot be pushed down. Likewise, the sun spur gear 10A cannot be pulled up.

Figure 3A:
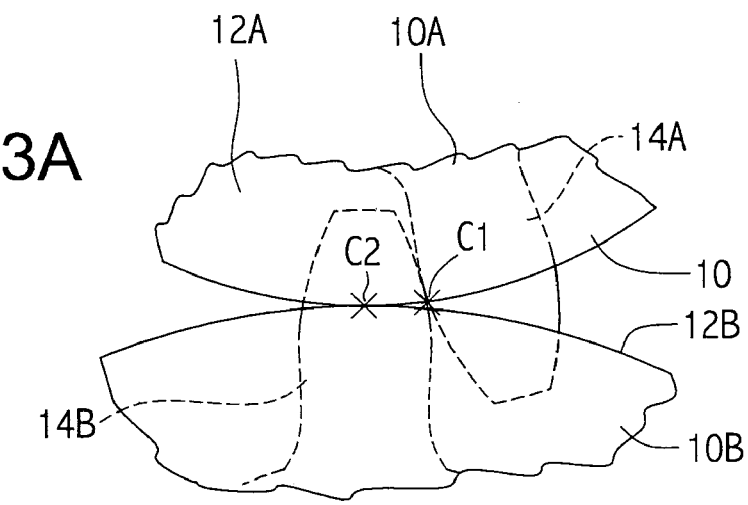
FIG. 3A is a partial top view of the spur gears of FIGS. 1 and 2 interacting.
Figure 3B:
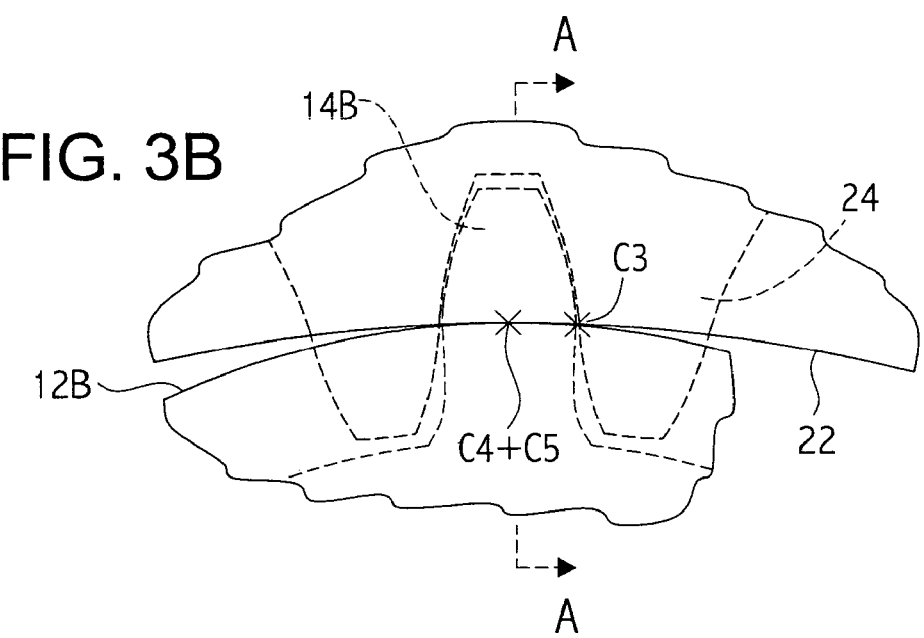
FIG. 3B is a partial top view of a spur gear interacting with a ring gear.
Figure 3C:
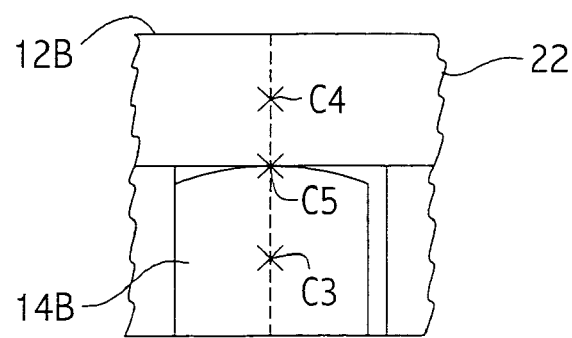
FIG. 3C is a sectional view taken through line A-A of FIG. 3B.

FIGS. 3A, 3B and 3C further illustrate how gears 10A, 10B, 18 interact with each other. FIG. 3A shows spur gears 10 interacting with other spur gears, illustrating the case where the sun spur gears 10A are interacting with the planet spur gears 10B. The teeth 14A of sun spur gear 10A contact the teeth 14B of planet spur gear 10B at point C1. The teeth 14B of planet spur gear 10B contact the roller 12A of sun spur gear 10A at point C2. FIG. 3B shows planet spur gears 10B interacting with ring gear 18. The ring gear teeth 24 contact the spur gear teeth 14B at point C3. FIGS. 3A and 3B show that the spur gear on spur gear case is essentially the same as the spur gear on ring gear case in terms of matching speeds for both the roll and gear surfaces. Spur roller 12B contacts ring roller 22 at point C4, and spur gear teeth 14B contact ring roller surface 22 at point C5. FIG. 3C shows that by crowning the tops of the spur gear 10 with the apogee of the crown 16 at the same radial distance as the roller and tooth pitch radii, ($R_1$, $R_2$) that thrust bearing contact occurs at the apogee point and so speed matching can be achieved for simultaneous and/or individual contacts between interfacing rollers, gear teeth and thrust bearing tooth tops/roller bottoms. This means, a planetary roller gear system will perform with great efficiency and strength. Furthermore, the addition of the rollers greatly improves the accuracy with which the gears mesh. The rollers precisely set gear locations with respect to each other. On the other hand, the gears act as a highly efficient and precise caging/carrier mechanism for the rollers. The cumulative result is a superior system that is also very simple and low cost.

Figure 4:
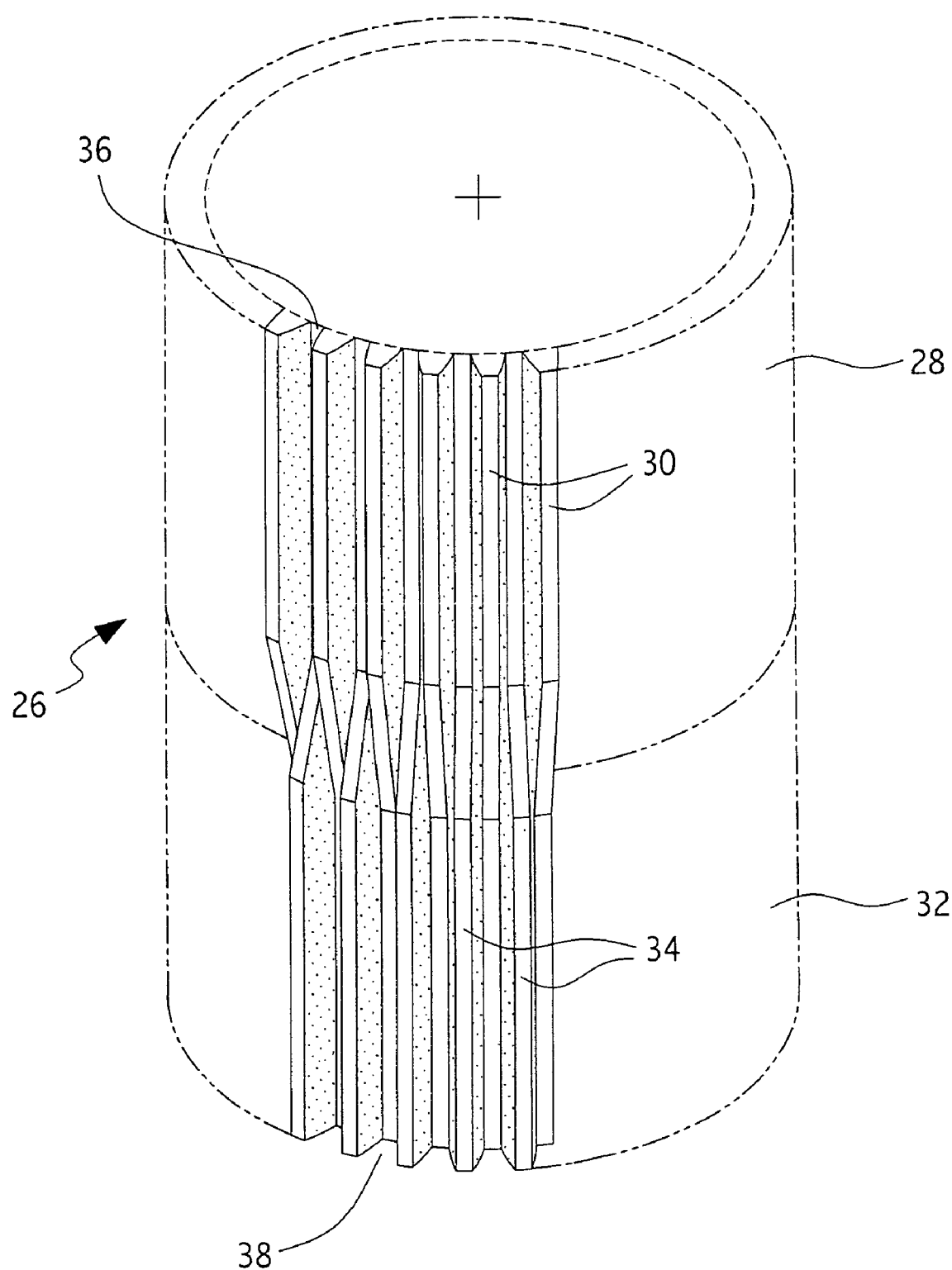
FIG. 4 is a perspective view of a phase-shifted gear bearing as used in a second embodiment of the present invention.

Turning now to FIGS. 4, 5 and 6, we discuss the second embodiment of the present invention, which involves phase-shifted gear bearings. FIG. 4 illustrates a phase-shifted spur gear 26 for use in phase-shifted gear bearings. Phase-shifted spur gear 26 includes an upper gear half 28 comprising upper gear teeth 30, and a lower gear half 32 comprising lower gear teeth 34. Upper gaps 36 and lower gaps 38 are formed between the gear teeth 32, 34. Upper gear half 28 is rotated with respect to lower gear half 32 so that the two halves are exactly out of phase with respect to each other. That is, upper gear teeth 30 are positioned above lower gaps 38, and lower gear teeth 34 are positioned below upper gaps 36. Thus, phase-shifted spur gear 26 could mesh with a phase-shifted gear just like it. As one gear turned and drove the other, both halves would be continuously contacting each other but, in different phases of contact. In FIG. 4, the lower gear teeth 34 are beveled and extended slightly between the upper gear teeth 30. The upper gear teeth 30 are beveled and slightly extended between the lower gear teeth 34 for both phase-shifted spur gears. Thus, the beveled tooth surfaces contact each other much in the same manner as a four-way thrust bearing, and gear teeth 30, 34 contact each other and engage in conventional spur gear motion. The two motions can be timed so as to maximize efficiency, strength and smoothness.

Figure 5A:
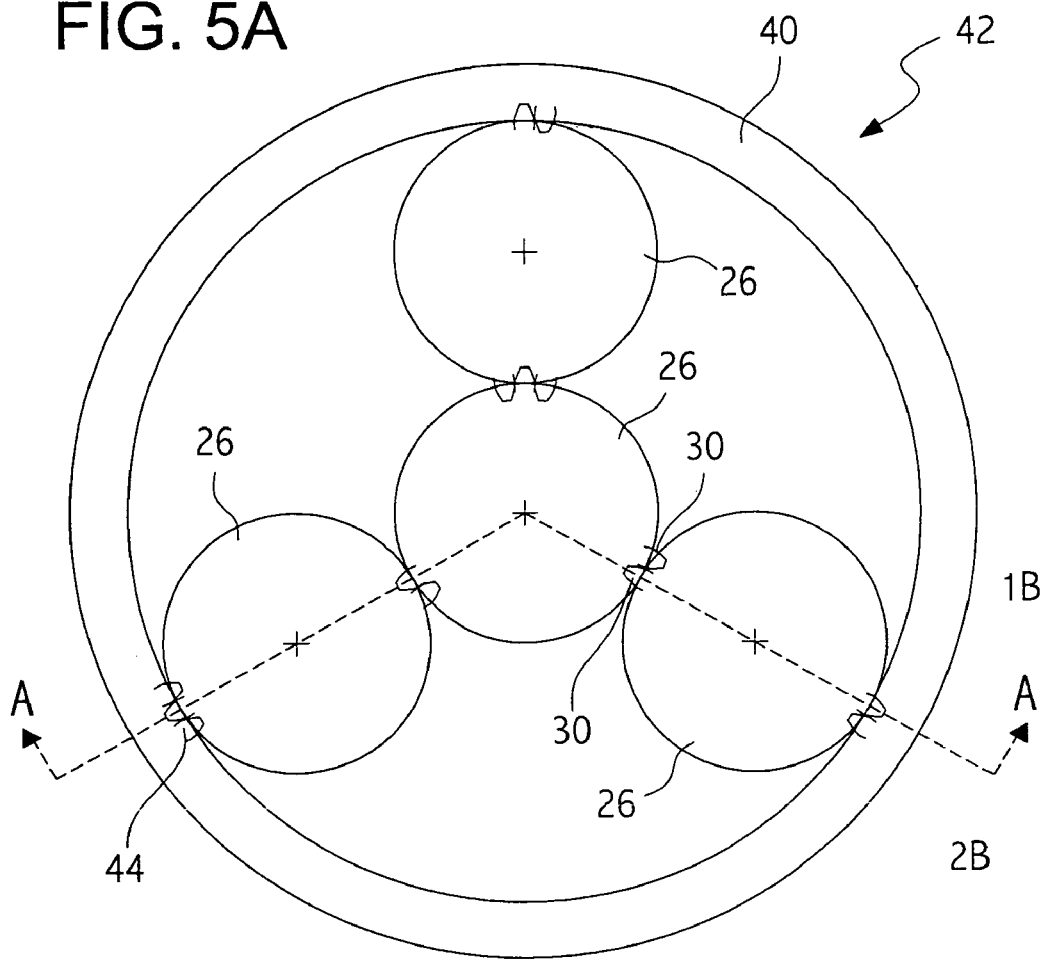
FIG. 5A is a top view of a planetary system utilizing the phase-shifted gear bearing of FIG. 4.
Figure 5B:
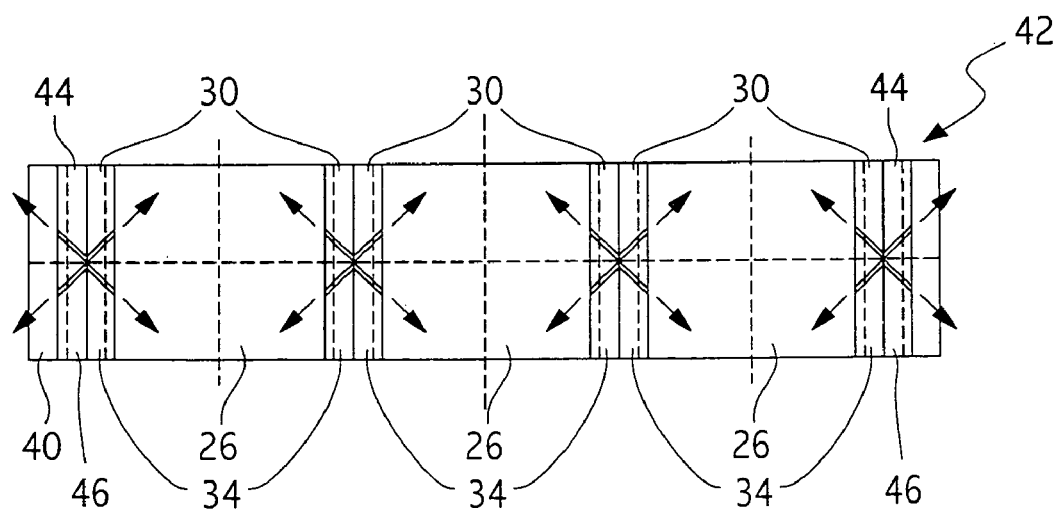
FIG. 5B is a cross-sectional view taken through line A-A of FIG. 5A.

Referring now to FIGS. 5A and 5B, we see that phase-shifted spur gears 26 can be configured with a ring gear 40, having upper ring gear teeth 44 and lower ring gear teeth 46, to form a planetary system 42, much like the system shown in FIGS. 2A and 2B. The planetary system 42 stays together in a similar manner to planetary system 20 of FIGS. 2A, 2B.

Figure 6A:
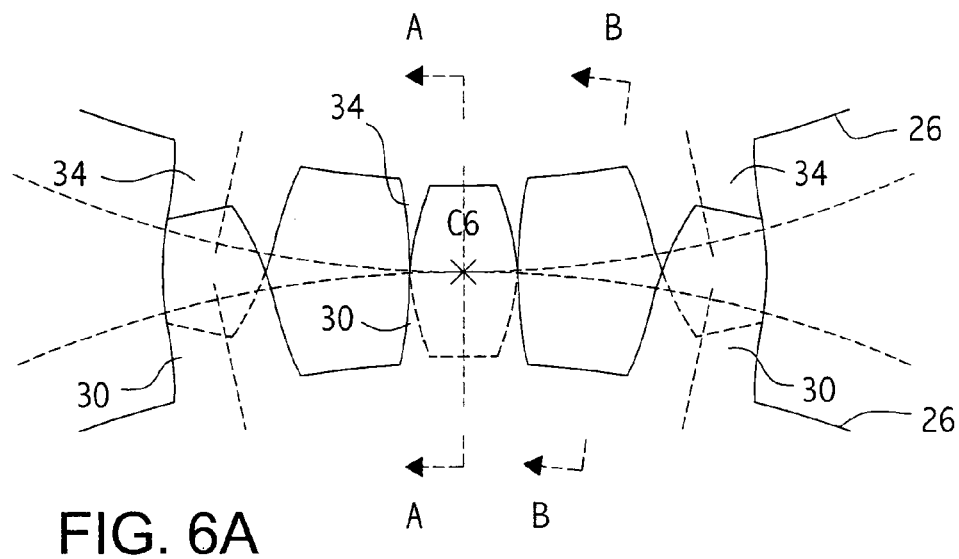
FIG. 6A is a partial top view illustrating the interaction of the phase-shifted gear bearings of FIG. 4.
Figures 6B, 6C, 6D:
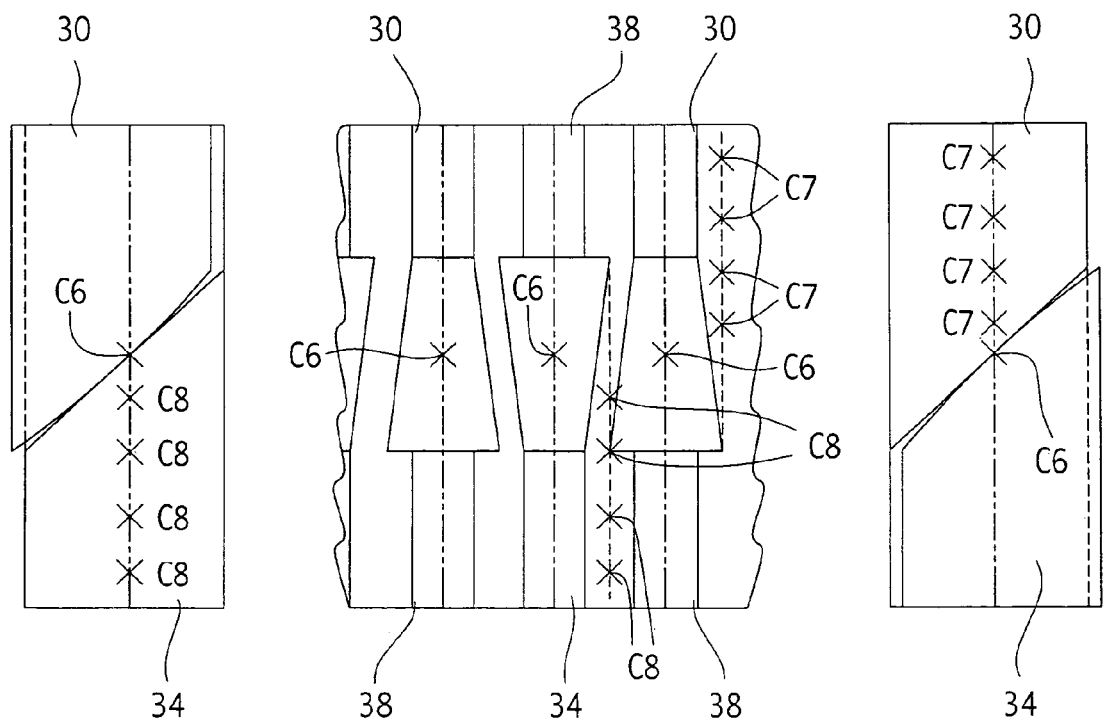
FIG. 6B is a sectional view taken through line A-A in FIG. 6A.
FIG. 6C is an edge view of FIG. 6A.
FIG. 6D is a sectional view taken through line B-B of FIG. 6A.

FIGS. 6A and 6B further illustrate how phase-shifted spur gears 26 interact with each other. FIG. 6A particularly illustrates upper gear teeth 30 of one phase-shifted spur gear 26 contacting lower gear teeth 34 of a second phase-shifted spur gear 26 at contact point C6. FIGS. 6B, 6C and 6D further illustrate contact points C7, where upper gear teeth 30 of the phase-shifted spur gears 26 contact; and contact points C8, where lower gear teeth 34 contact. FIG. 6C is an edge view of FIG. 6A.

Figure 7A:
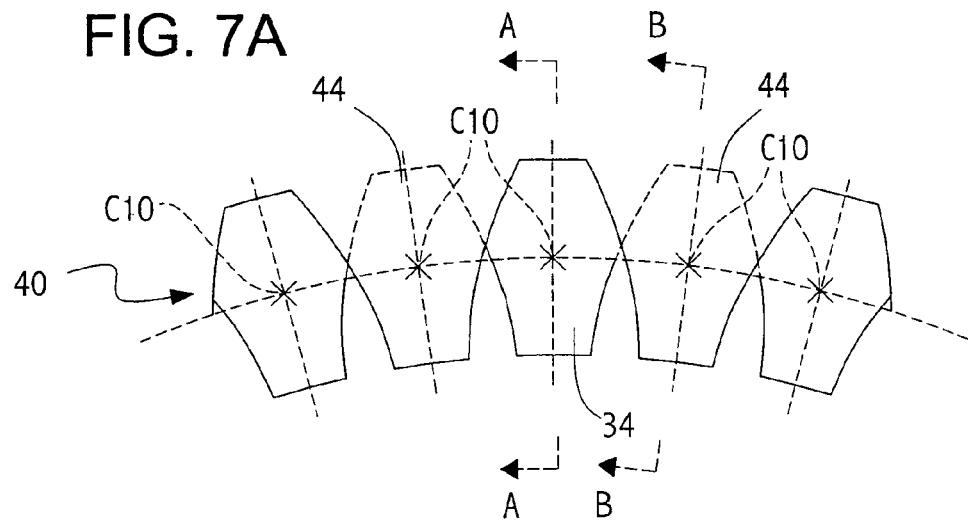
FIG. 7A is a partial top view illustrating the interaction of the phase-shifted spur gears and the ring gear of FIG. 4.
Figures 7B, 7C, 7D:
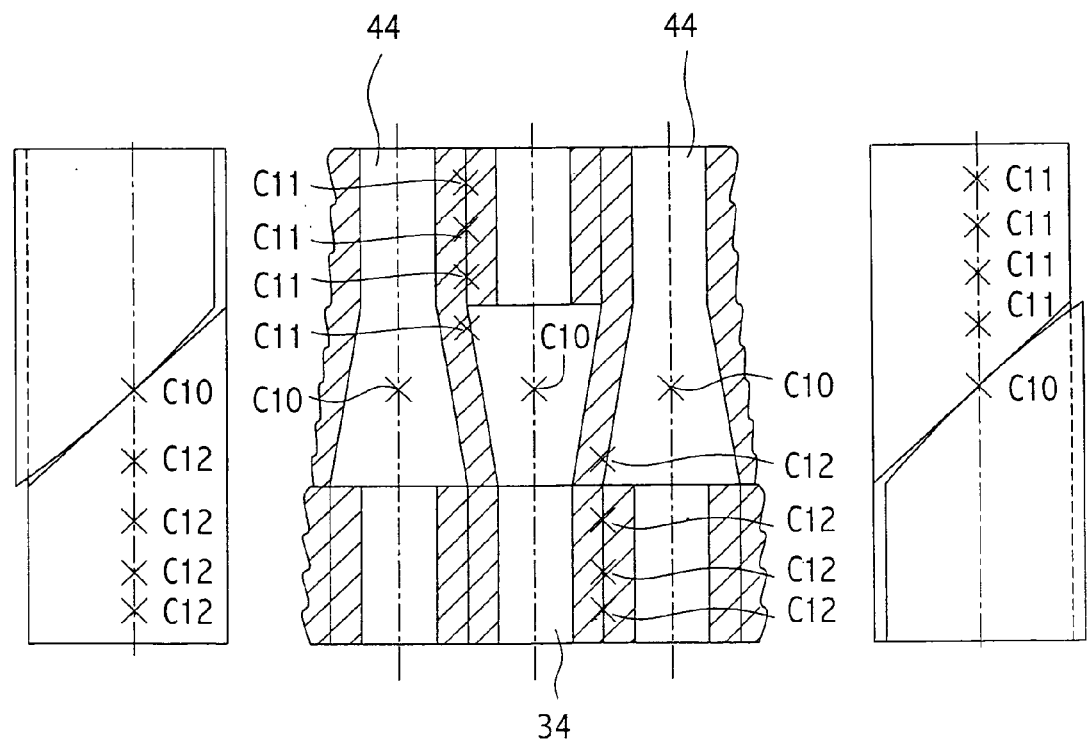
FIG. 7B is a sectional view taken through line A-A in FIG. 7A.
FIG. 7C is an edge view of FIG. 7A.
FIG. 7D is a sectional view taken through line B-B of FIG. 7A.

FIGS. 7A and 7B illustrate how phase-shifted spur gears 26 interact with ring gear 40. FIG. 7A particularly illustrates upper ring gear teeth 44 contacting lower gear teeth 34 of phase-shifted spur gear 26 at point C9. FIGS. 7B, 7C and 7D further illustrate contact points C10, where the upper gear teeth 30 of the spur gear contact the upper ring gear teeth 44; and contact points C11, where lower gear teeth 34 contact the lower ring gear teeth. (not shown)

Figure 8A:
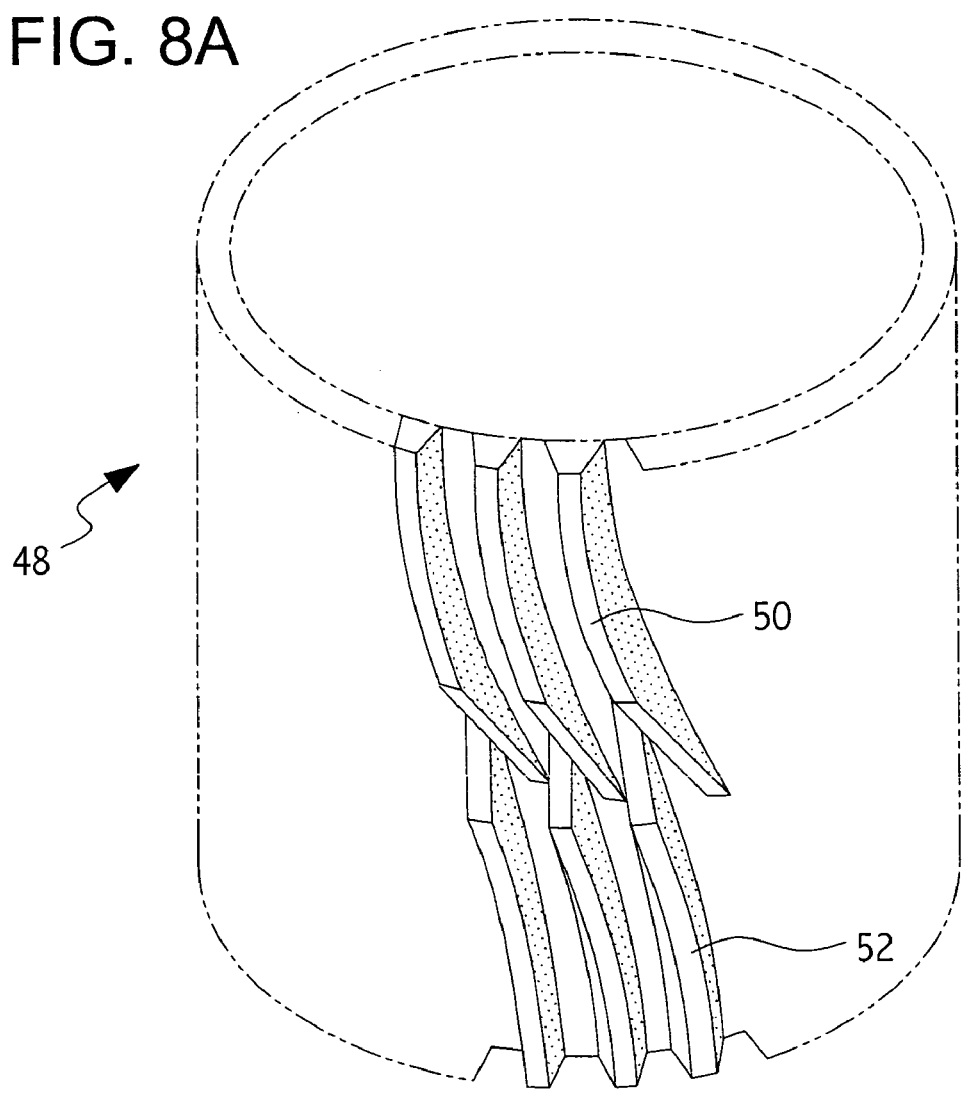
FIG. 8A is a perspective view of a helical phase-shifted spur gear as used in a third embodiment of the present invention.
Figure 8B:
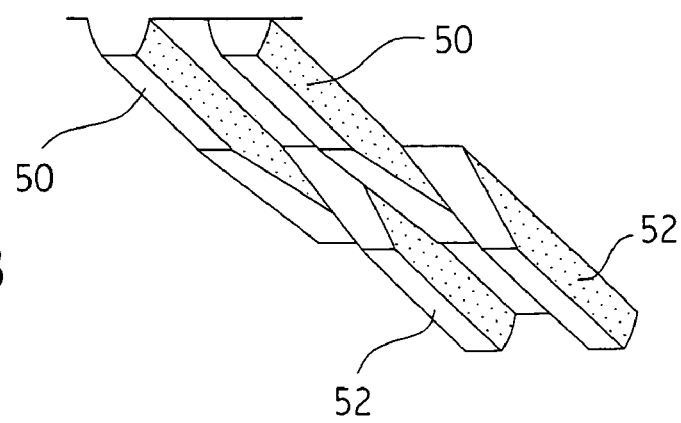
FIG. 8B illustrates a peeled open edge view of the teeth of the phase-shifted helical gear bearing of FIG. 8A.

FIGS. 8A and 8B illustrate the third embodiment of the present invention, namely, helical gear bearings, in which spur gear 26 is replaced by a helical (or herring bone) gear 48. The same timing issues and geometries that worked for the phase-shifted spur gear 26 apply in this embodiment. Although, FIGS. 8A and 8B show the case of phase-shifted helical gear bearings, a conventional roller gear bearing with helical teeth is also possible. FIG. 8B illustrates a peeled open edge view of upper helical teeth 50 and lower helical teeth 52.

Figure 9:
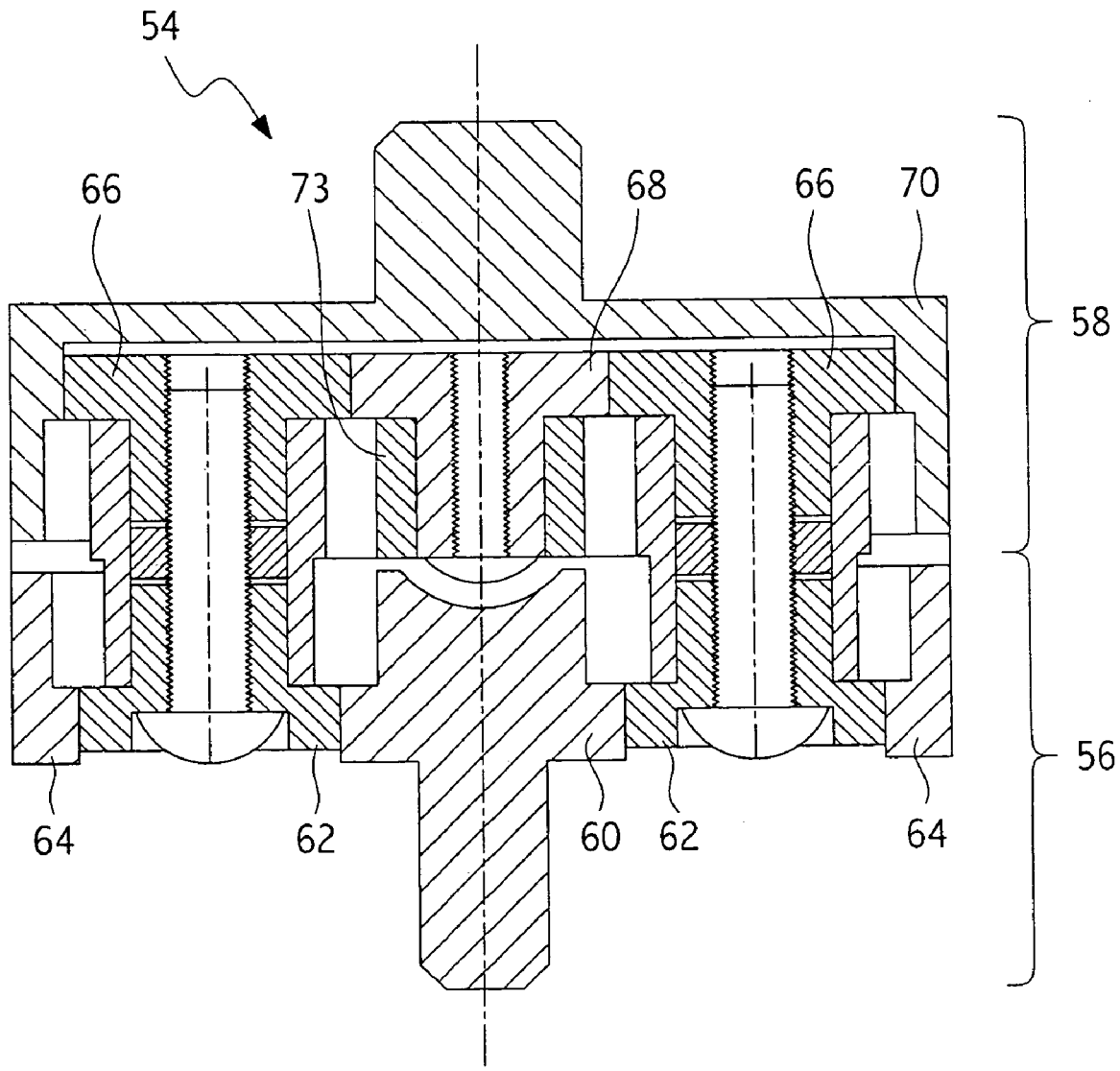
FIG. 9 is a sectional view of a planetary transmission featuring roller gear bearings according to the present invention.
Figure 10:
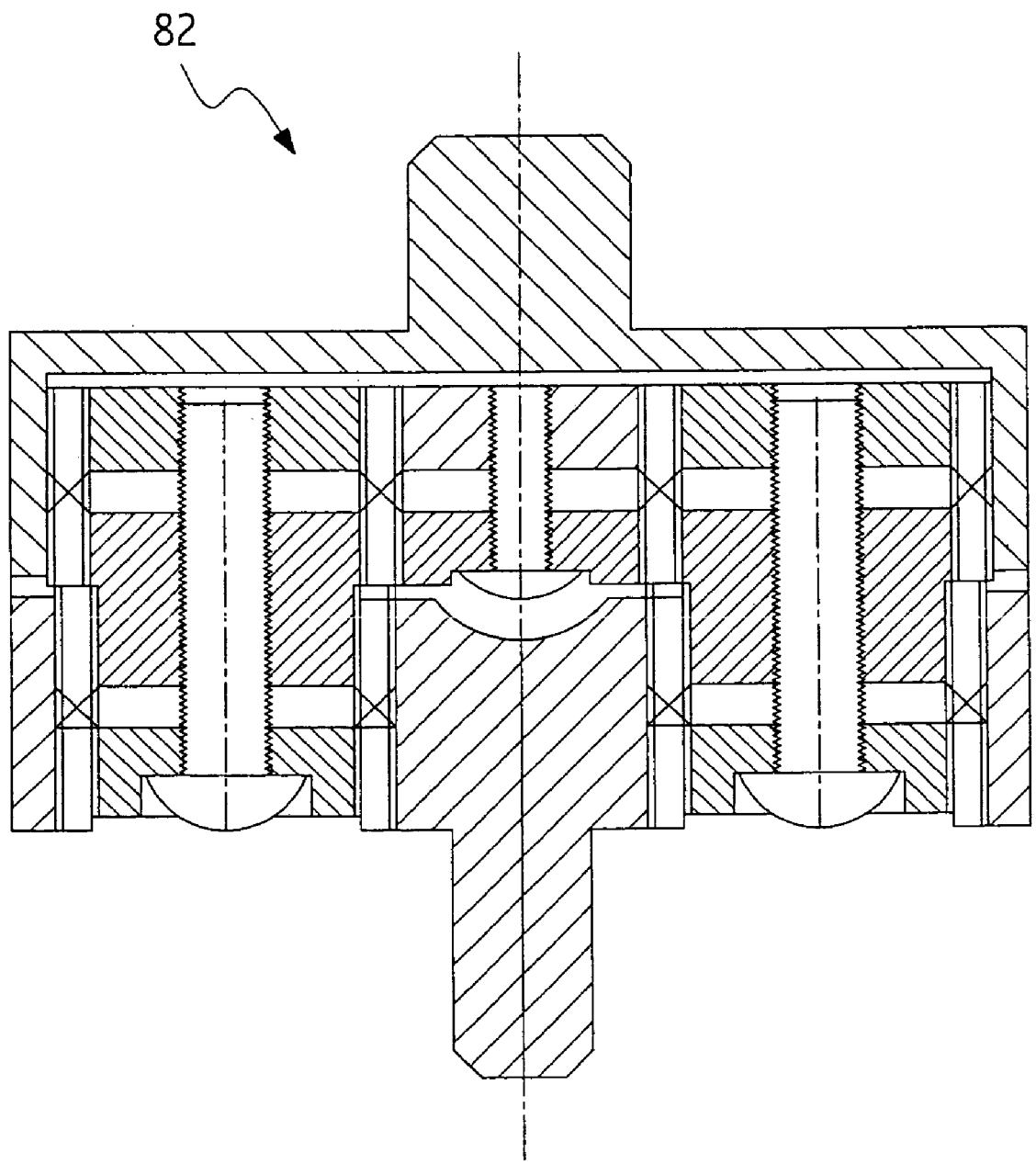
FIG. 10 is a sectional view of a planetary transmission using phase-shifted gear bearings according to the present invention.

The number of variations on the gear bearing arrangement of the present invention are endless, but only two will be discussed here. FIGS. 9 and 10 illustrate planetary transmissions using roller gear bearing and phase-shifted gear bearings, respectively. These planetary transmissions are fixed mechanical advantage transmissions which show great promise in being strong, compact, very efficient, carrierless, simple and capable of great speed reduction. The two concepts are functionally very similar, thus the explanation for roller gear bearings can easily be extended to the phase-shifted case.

The roller gear bearing planetary transmission generally operates as follows. The transmission 54 comprises an input system 56 and an output system 58. Input system 56 comprises input sun roller gear 60, input roller gear planets 62 and ground ring roller gear 64. Output system 58 comprises output roller gear planets 66, output roller gear sun 68 and output ring roller gear 70. The planets 62, 66 of both systems 56, 58 are axially joined together and thus, have the same angular velocity and orbit about the center of the transmission 54 at the same angular velocity. The input sun roller gear 60 drives the input roller gear planets 62 which, in turn, react against the ground ring roller gear 64 by rotating at some angular velocity and orbiting about the center of transmission 54 at some orbital angular velocity. Thus, the orbital angular velocity and the rotational angular velocity for the planets 62, 66 are set. However, the output roller gear planets 66 have a different tooth pitch diameter than the input roller gear planets 62. Thus, the output ring roller gear 70 has a different speed than the ground ring roller gear 64 and the transmission 54 exhibits speed reduction. The output roller gear sun 68 is in place primarily to provide strength and rigidity to transmission 54, keeping the output system 58 together with strength and precision just as the output sun roller gear sun 68 does for input system 56. Thus, the two systems 56, 58 are independently strong and rigid and the combined system is even stronger.

We will now derive the transfer function for the transmission 54 and, in so doing obtain further understanding of how it works.

$$\omega_{OR}R_O - \omega_P R_{PO} = \omega_O R_O \tag{1}$$

$$\omega_{OR}R_O + \omega_P R_{PI} = \omega_S R_S \tag{2}$$

Where:
$\omega_{OR}$=planet angular orbital velocity.
$R_O$=transmission output radius.
$\omega_P$=planet angular velocity.
$R_{PO}$=planet output radius.
$\omega_O$=output orbital angular velocity.
$R_{PI}$=planet input radius.
$\omega_S$=sun angular velocity.
$R_S$=sun radius.

$$(R_S + 2R_{PI})\theta_{OR} = R_{PI}\theta_{PI} \tag{3}$$

Where:
$\theta_{PI}$=some arbitrary angle a planet rotates.
$\theta_{OR}$=the corresponding angle the planet orbits.

Taking the time derivative of both sides of eq. (3) we get:

$$(R_S + 2R_{PI})\frac{\delta\theta_{OR}}{\delta\tau} = R_{PI}\frac{\delta\theta_{PI}}{\delta\tau} \tag{4}$$

$$\frac{\delta\theta_{OR}}{\delta\tau} = \omega_{OR} \tag{5}$$

-continued $$\frac{\delta\theta_{PI}}{\delta\tau} = \omega_{PI} = \omega_{PO} = \omega_P \quad (6)$$

Eqs. (4), (5) and (6) come from the basic definition of angular velocity and from the fact that a planet has a single angular velocity for both the input and output interfaces and establish the relationship between $\omega_P$ and $\omega_{OR}$.

$$\frac{\omega_P R_{PI} R_O}{(R_S + 2R_{PI})} - \omega_P R_{PO} = \omega_O R_O \quad (7)$$

$$\frac{\omega_P R_{PI} R_S}{(R_S + 2R_{PI})} + \omega_P R_{PI} = \omega_S R_S \quad (8)$$

Esq. (7) and (8) come from substituting for $\omega_{OR}$.

$$\frac{\omega_S R_S}{\omega_O R_O} = \frac{R_{PI} R_O + R_{PI}(R_S + 2R_{PI})}{R_{PI} R_O - R_{PO}(R_S + 2R_{PI})} \quad (9)$$

$$\frac{\omega_S}{\omega_O} = \frac{(R_O)[2(R_{PI})^2 + R_{PI}(R_O + R_S)]}{R_S[R_{PI} R_O - R_{PO}(R_S + 2R_{PI})]} \quad (10)$$

$$\frac{\omega_S}{\omega_O} = \frac{(R_O)[2(R_{PI})^2 + R_{PI}(R_O + R_S)]}{R_S[R_{PI}(R_O - 2R_{PO}) - R_{PO} R_S]} \quad (11)$$

Eq. (11) comes from rearranging terms in eqs. (9), (10).

$$\frac{T_O}{T_I} = ? \frac{\omega_s}{\omega_O} \quad (12)$$

Eq. (12) states conservation of energy.

Let:
 ?=85%
 $R_{PI}=R_S=0.25$ in.
 $R_{PO}-R_{PI}=0.020$ in.

Since:
$R_O=R_S+R_{PI}+R_{PO}$
$R_O=0.770$ in.

So:

$$\frac{\omega_S}{\omega_O} = -117$$

$$\frac{T_O}{T_I} = 99.5 (SAY - 100)$$

An estimate that the transmission can withstand 60 ft-lb output torque is derived as follows:

The largest stress will be on the planet teeth that push off against the ground ring roller gear 64. This is because the lower planet radius is slightly smaller than the upper planet radius and because it will take slightly more load. Assuming 20 teeth in the planet.

$(\pi 2R_{PI}L)58E3(.6)(.25 \text{ in.}) =$ max allowable shear load per tooth 40 = 342 lbs.

Where:
 L=length of teeth that can resist shear=0.25 in.
 58E3=yield strength of material with 2:1 safety factor.
 0.6=shear factor.
 40=20 teeth+20 spaces between teeth.

With 3 planets we get 1.024945E3 lbs.=F. And $$\frac{1.024945E3 \text{ lbs}(.770 \text{ in.})}{12 \text{ in./ft.}} = 65 \text{ ft./lbs.}$$

Assembly of transmission 54 will now be discussed. To assemble transmission 54, the roller portions of the planets 62, 66 are positioned in output ring roller gear 70. The roller of input sun roller gear 60 is then positioned in the arrangement. The other planet gear teeth cylinders 72 are then tightly fit over each of the bottom roller portions of the planets 62, 66 and, at the same time, meshed with the teeth of the output ring roller gear 70. The input sun roller gear teeth cylinder 73 is then tightly fit over the roller of the input sun roller gear 60, meshed with the teeth of the planets 62, 66 and fastened in place with an assembly screw. The ground ring roller gear 64 is then slipped in place, its teeth meshing with the teeth of the planets 62, 66 as it goes. Next, input sun roller gear 60 is slipped into place, its teeth meshing with those of the planets 62, 66 as it goes. The three bottom portions of the planet rollers are each then fit tightly into their respective planet gear teeth cylinders and splined into the roller portion of the planet already in place. Then, each of the planets 62, 66 is finalized in its assembly with a fastening screw. The entire transmission 54 is now assembled, aligned and ready to function.

Disassembly is accomplished by reversing the steps. It should be noted that if the output roller gear sun 68 can be manufactured in a single piece, and the assembly/disassembly process can proceed, essentially unchanged.

Referring to FIG. 10, we see a sectional view of a planetary transmission 82 using phase-shifted gear bearings. The phase shifted gear bearing transmission 82 has a similar structure to roller gear bearing transmission 54. However, the corresponding input and output sun and planet gears, as well as the ring gear, comprise phase-shifted gear bearings as opposed to roller gear bearings. The assembly/disassembly process for the phase-shifted gear bearing transmission of FIG. 10 is essentially identical to that described with respect to the transmission 54 of FIG. 9.

Figure 11:
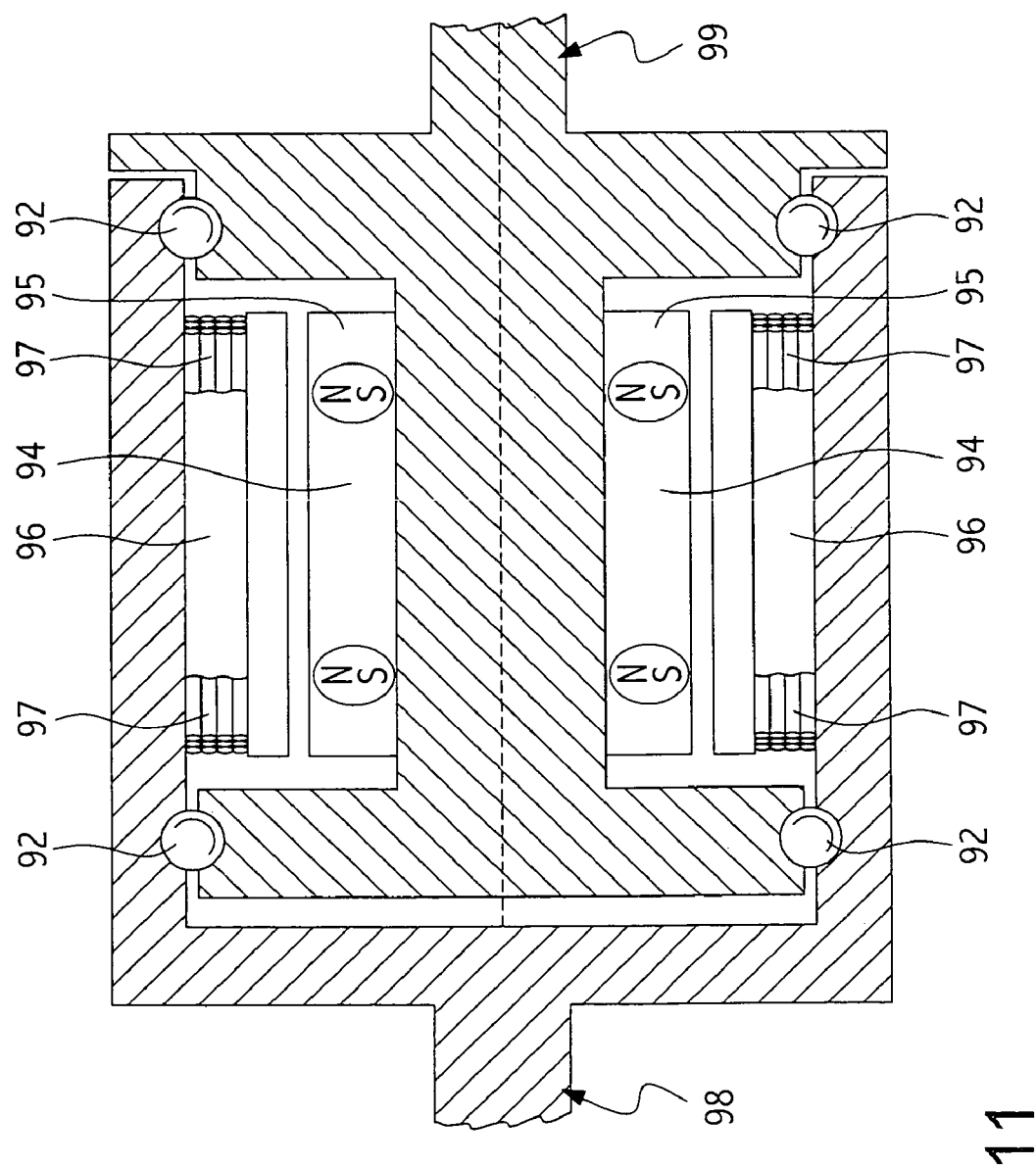
FIG. 11 is a sectional view of an existing electric motor.

The present gear bearing can also be used to improve electric motors. FIG. 11 is a sectional view of an existing electric motor 90, requiring two sets of ball bearings 92, which separate armature 94 from stator 96. The armature 94 includes permanent magnet 95, and the stator 96 includes coils 97. The ball bearings 92 also allow the armature 94 to rotate with respect to the stator 96, typically by using the weak forces of electric motors. The motor 90 further includes a motor mount screw 98, and an output drive 99.

Figure 12:
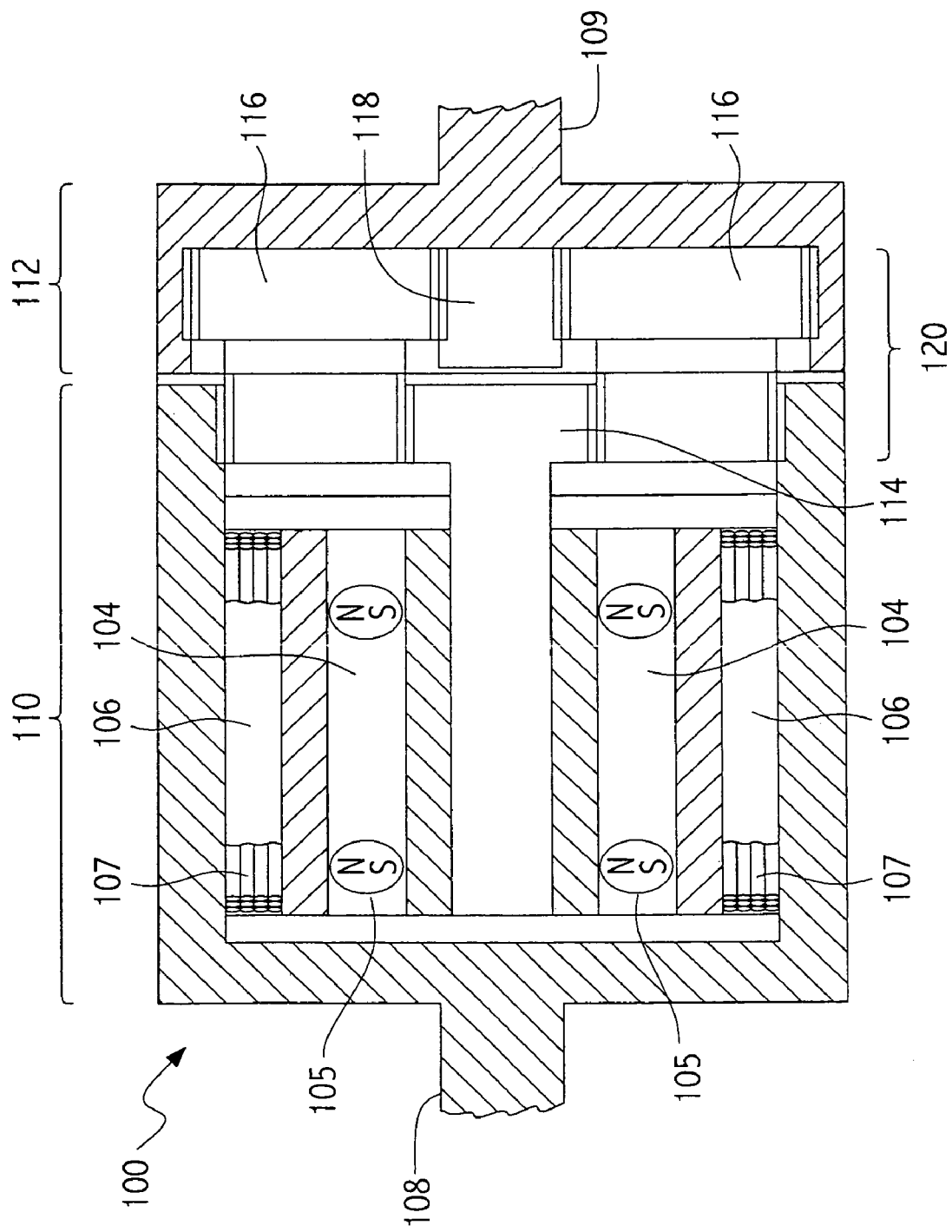
FIG. 12 is a sectional view of an electric motor including the present gear bearings.

FIG. 12 is a sectional view of an electric motor 100 using the gear bearings of the present invention. Motor 100 is similar to the existing motor design in that it includes armature 104, including permanent magnets 105, stator 106, including coils 107, and motor mount screw 108. These elements form a housing 110. Motor 100 also comprises an output 112, including an output screw 109.

Instead of using ball bearings, motor 100 has sun gear bearing 114, a gear bearing transmission 120, comprising a sun gear bearing which drives plant gear bearings 116, which in turn drive the output 112. An idler 118 acts as a stiffener and is placed between planet gear bearings 116.

The gear bearing transmission 120 results in a smaller, simpler design that is easier to assemble as compared to the existing ball bearing design.

Referring now to FIGS. 13-17, another embodiment is discussed, which is directed to an anti-backlash feature. The purpose of the anti-backlash feature is to reduce, if not eliminate entirely, the so-called dead zones experienced with virtually all gear systems. Dead zones are regions of play in which the output experienced is not the output expected or desired in the normal course of interactive gear movement. Contemplated uses of anti-backlash gear bearings include use as compact actuators for moving apparatus, such as aircraft ailerons or flaps, against large forces, as well as for precision placement of sensitive components, such as scientific instruments.

Figure 13A:
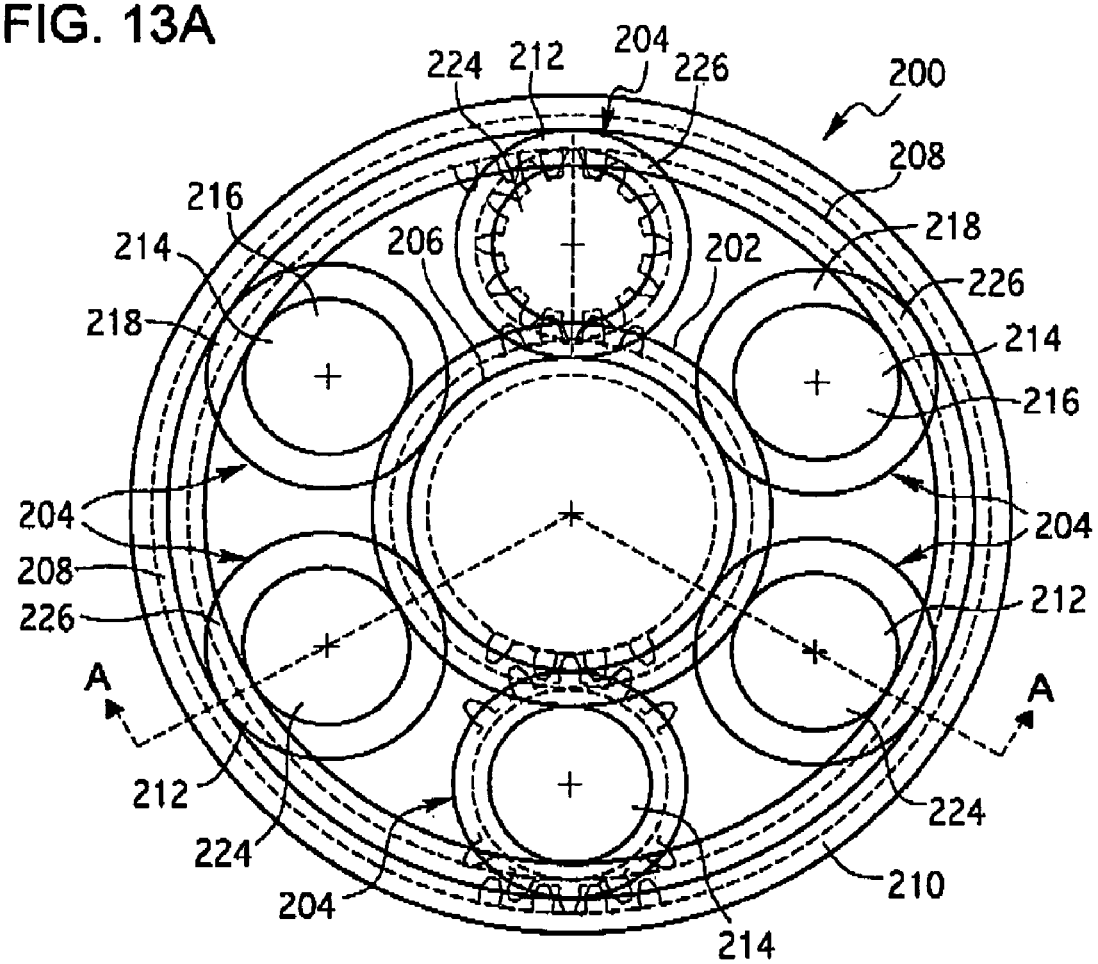
FIG. 13A is an overhead view of a planetary system according to another embodiment of the present invention, including anti-backlash features.
Figure 13B:
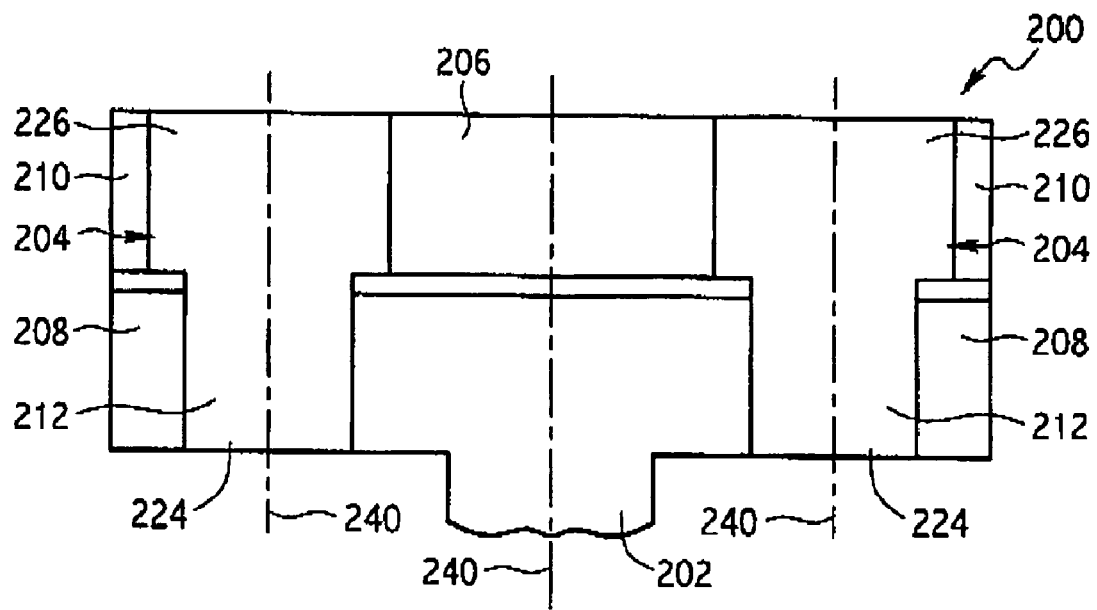
FIG. 13B is a cross-sectional view taken through line A-A of FIG. 13A.

The main components for the anti-backlash planetary transmission 200 of FIG. 13 include a sun gear bearing 202, at least six planet gear bearings 204, an idler gear bearing 206, a ground ring gear bearing 208, and an output ring gear bearing 210. The planet gear bearings 204, as best seen in FIGS. 14A and 14B, comes in at least two variations, one solid (planet 212) and the other split (planet 214). Each of the split planets 214 comprises an upper or top half 216 and a lower or bottom half 218. The halves 216 and 218 are continuously forced apart by a biasing mechanism, such as back-to-back Belleville washers 220, as shown in FIG. 14A. One skilled in the art will recognize that there are many biasing mechanisms known that could be used and that Belleville washers are simply one preferred form thereof.

In another embodiment, there is an equal number of solid planets 212 and split, or "sprung," planets 214, and they are disposed in alternating fashion, such that each solid planet 212 is placed between two sprung planets 214, and each sprung planet 214 is placed between two solid planets 212. The sprung gear bearing planets 214 preload against the solid gear bearing planets so as to create an anti-backlash feature in the transmission system 200. Preferably, the gear bearing components all use small angle helical gear forms to lend the sprung gear bearing planets 214 a twisting motion (top half 216 with respect to bottom half 218) which, in turn, substantially eliminates backlash from the entire transmission 200.

Referring to FIGS. 13-16, it is demonstrated how the anti-backlash feature is created throughout the transmission 200, and how it is maintained under reversal of rotation direction and under load. FIG. 13A shows six planets 204 equally spaced around the transmission 200 with a sprung planet 214 alternating with a solid planet 212. FIGS. 14A and 14B show that the planets 204 (both sprung planet 214 and solid planet 212) preferably comprise small angle helix gears. Preferably, the bottom half 218 of each sprung planet 214 has a stem 222, which permits the two halves 216 and 218 to linearly slide with respect to each other, but restrains the two halves 216 and 218 from rotating with respect to each other.

Figure 16:
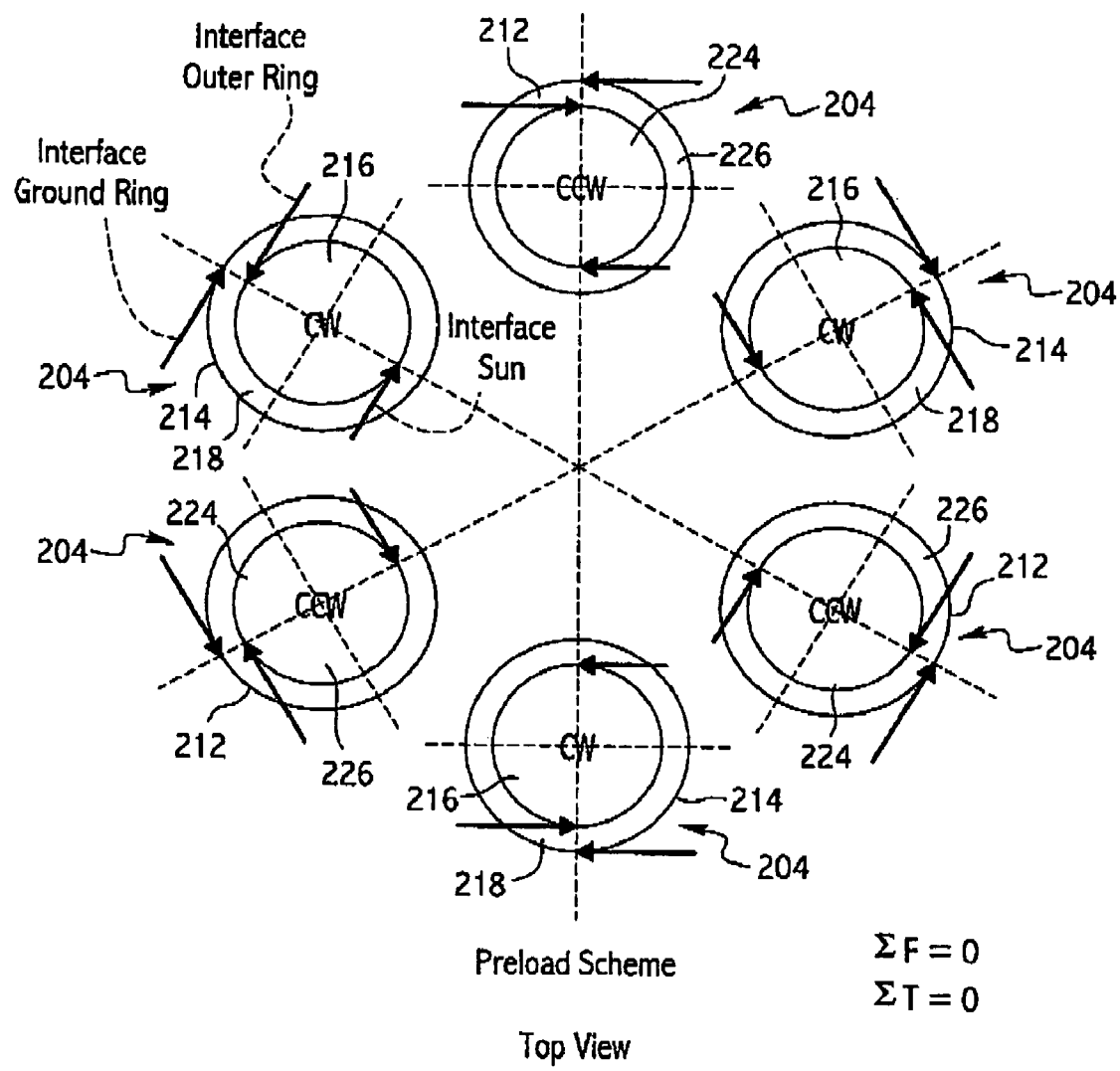
FIG. 16 is an overhead diagram showing the preload scheme of the planet gears of the embodiment of FIG. 13A.

FIG. 16 illustrates the chain reaction that results from the top and bottom halves 216 and 218, respectively, of the sprung planets 214 sliding apart from each other. As each top half 216 of a sprung planet 214 moves upwards responsive to the biasing mechanism 220, it contacts the output ring 210, and each of the top halves 216 pushes the output ring 210 upwards with them. But the upward motion of the output ring 210 is arrested by the top halves 224 of the solid planets 212. Similarly, as each bottom half 218 of a sprung planet 214 slides downward responsive to the biasing mechanism 220, it contacts the ground ring 208 and the bottom halves 218 push the ground ring 208 downward with them. But downward motion of the ground ring 208 is arrested by the bottom halves 226 of the solid planets 212.

Since the top half 216 of each sprung planet 214 interacting with the output ring 210 has a force on its contact gear tooth from left to right, and the lower half of each sprung planet 214 interacting with the ground ring 208 has a force on its contact tooth from right to left, and since there is a lever arm between the two forces, each of the sprung planets 214 experiences a clockwise torque. This torque introduces a tumbling motion in each of the sprung planets 214 until each encounters the sun gear bearing 202, where it experiences a counter clockwise stabilizing torque. The solid planets 212 each experience a counterclockwise torque and begin to tumble counterclockwise until each encounters the sun gear bearing, where it receives a clockwise stabilizing torque.

Figure 17:
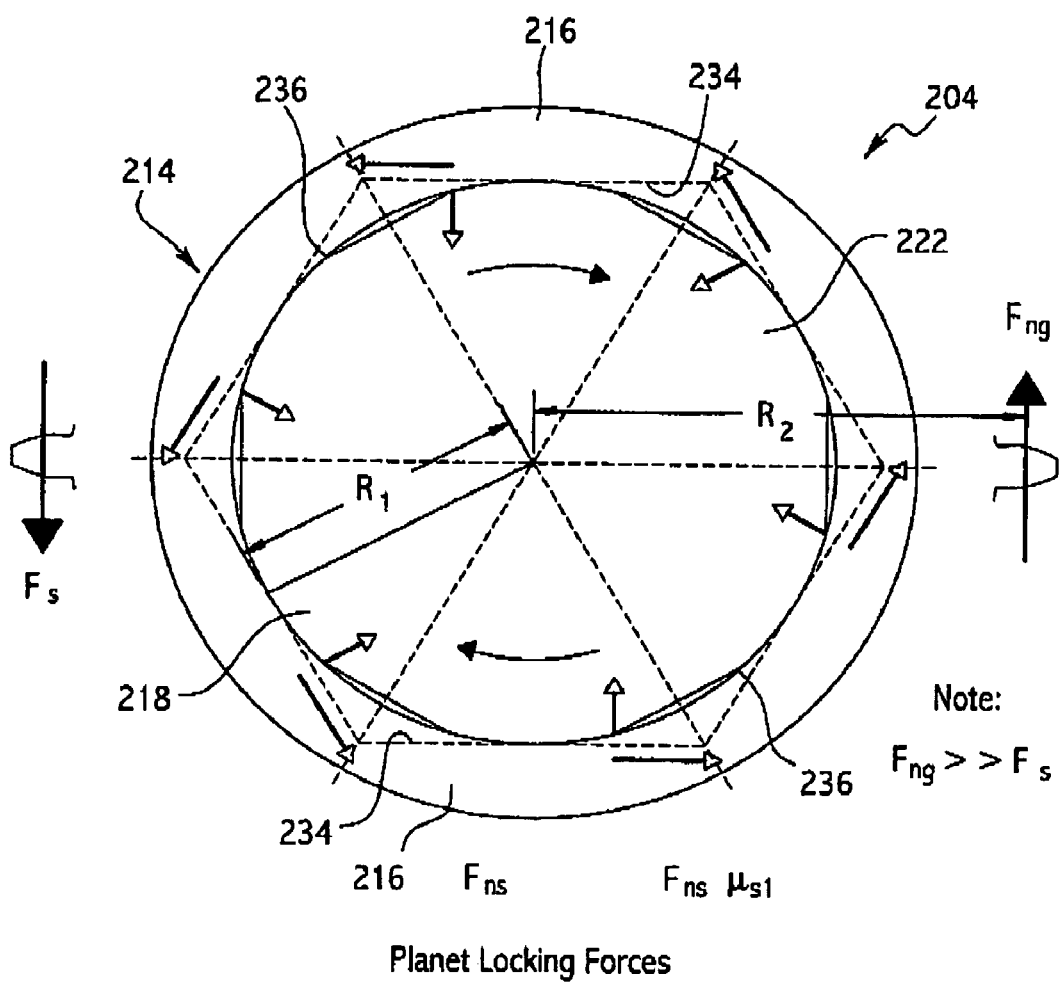
FIG. 17 is an overhead diagram showing the forces that lock the planets gears of the embodiment of FIG. 13A in place.

FIG. 17 shows a top or overhead view of the preload forces on the planets 212 and 214. FIG. 16 can be compared with FIG. 17 to show how the preload forces inherently position the planet teeth to contact the output ring 210, the ground ring 208, and the sun gear bearing 202, such that one set of planets 212 or 214 drives the output when the sun gear bearing 202 is rotated clockwise and the other drives the output when the sun gear bearing is turned counterclockwise. In each instance, the set of planets not driving the output remains in intimate contact, as shown in FIGS. 16 and 17, and stabilizes against drive planet tumbling. A preferred order of events for assembling the transmission 200 with the anti-backlash feature will be summarized below in Table 1.

TABLE 1

TRANSMISSION ASSEMBLY AND ANTI-BACKLASH PRELOAD ORDER.

(1) The idler 206 and the ground ring 208 are placed on a flat surface.
(2) The sprung planets 214 are placed inside the ground ring 208 and outside the idler 206.
(3) The solid planets 212 are also placed inside the ground ring 208 and outside the idler 206.
(4) The ground ring 208 is placed over the top of the solid planets 212 and the sprung planets 214.
(5) The sprung planet halves 216 and 218 are pushed together, thereby compressing the biasing mechanism 220, and the output ring 210 follows the top sprung planet half 216 down and remains in contact with it, while the ground ring 208 follows the bottom sprung planet half 218 and remains in contact with it.
(6) The sun gear bearing 202 is inserted in between and in mesh with the planets 204.
(7) The sprung planets 214 actuate the preload process when their sprung halves 216 and 218 begin to separate axially. During separation, the top sprung planet halves 216 encounter the output ring 210 (because both have helical tooth forms) and, together, take the output ring 210 with them until the output ring 210 encounters the top solid planet halves 224 and is stopped. Simultaneously, the bottom sprung planet halves 218 encounter the ground ring 208 (because both have helical tooth forms) and, together, take the ground ring 208 with them until the ground ring encounters the bottom solid planet halves 226 and is stopped. The solid planets 212 are, in effect, pulled apart and so do not move axially.
(8) FIGS. 14-16 as an example show that this process positions three of the planets 204 against the ground ring 208 and output ring 210, with anti-backlash coupling between ground ring 208 and output ring 210 for clockwise motion, and the other three planets 204 provide anti-backlash coupling between ground ring 208 and output ring 210 for counterclockwise motion.
(9) FIG. 15 shows how the sun gear 202 fits into this process. The TABLE 1-continued

TRANSMISSION ASSEMBLY AND ANTI-BACKLASH PRELOAD ORDER.

left column of FIG. 15 illustrates the force between the top sprung planet halves 216 and the output ring 210, taken with the force between the bottom sprung planet halves 218 and the ground ring 208, along with the axial separation of between the ground ring 208 and the output ring 210, provides a clockwise tumbling impetus to each of the sprung planets 214, which is arrested by the sun gear 202. The right column of FIG. 15 shows the reacting forces from the solid planets 212 creating a corresponding counterclockwise tumbling action, which, again, is stopped by the sun gear 202. Thus, the sun gear 202 is coupled into the anti-backlash arrangement. FIG. 16 illustrates how these preload anti-backlash forces are also correct from the standpoint of gear bearing transmission mechanical torque transfer.

It should be noted that FIGS. 15-17 do not show the influence of any radial forces. Since such radial forces exist, although minimally, these will now be addressed. In FIG. 14, we note that in one preferred embodiment the very top and bottom of each of the planets 204 have been turned to create serrated bearing surfaces 228. These surfaces 228 have valleys 230 of the helical tooth form interspaced with roller bearing surfaces 232. When in contact with solid rollers, i.e. sun gear 202 and idler 204, and with solid rings, i.e. output ring 210 and ground ring 208, the planets 204 with serrated bearing surfaces 228 function as solid rollers, except they can be more easily assembled.

From the geometry shown in FIGS. 14A and 14B, we can see:

$$H \sin(\theta) \geq \frac{\pi D_P}{2 N_T} \quad (13)$$

or:

$$H \geq \frac{\pi D_P}{2 N_T \sin(\theta)} \quad (14)$$

where we have by way of example:
$D_P$=Planet diameter=2.1 in.
$N_T$=No. of planet teeth=21
$\theta$=Helix tooth angle=15°
Which results in:

$$H \geq 0.6069091 \text{ in.} \quad (15)$$

So we can see that by using a serrated roller of modest axial length (about 30% of the gear tooth length) we get, in effect, a solid roller bearing that permits the transmission 200 to function as a differential gear bearing transmission, except that it assembles much more easily. The serrated rollers can pass through the teeth of both ring gears 208 and 210 (both output and ground ring gears) and the teeth of the sun gear 202 and the idler 204 during assembly and; come to rest opposite solid racesf (not shown) of the output and ground rings 210 and 208, respectively, and opposite the solid rollers of the sun gear 202 and the idler 204. This makes the snap fit assembly feature, described in Table 1 above, possible.

The idler 204 preferably comprises a roller (not shown) to stabilize and stiffen the planets 204 from tilting radially inward or outward, and may include a gear that has thinned teeth so as not to interject any gear forces which interfere with the torque transfer and anti-backlash functions of the transmission 200.

The role of the sprung planet stems 222 will now be examined in more detail (see FIGS. 14-17). FIG. 14A shows a side cross-sectional view of the interface between the stem 222, the bottom half 218 of each sprung planet 214, and the top half 216 of each sprung planet 214. FIG. 17 shows a top view of the interface between the stem 222 and the top half 216 of each sprung planet 214, showing by way of illustration how to prevent the top and bottom halves 216 and 218, respectively, from rotating with respect to each other. As one skilled in the art will notice, rotation can be prevented by any of several spline configurations. FIG. 17 shows a "locking hex" arrangement, wherein the interior surface 234 of the top half 216 of each sprung planet 214 has a hexagonal shape. The outer surface 236 of the stem 222, attached to the bottom half 218 of each sprung planet 214, has a modified hexagonal shape and fits snugly inside the planet upper half 216, while still allowing for linear sliding movement. The modifications are such that when the planet halves 216 and 218 attempt to twist with respect to each other, they generate planet locking forces, such that each sprung planet 214 acts like a solid planet 212 in resisting downward axial bearing forces.

This planet locking process is now examined in further detail.
We know:

$$F_{Down} = F_{NG} \sin(\theta) + F_{NG}\mu_{SG} \cos(\theta) \quad (16)$$

or:

$$F_{Down} = F_{NG}[\sin(\theta) + \mu_{SG} \cos(\theta)] \quad (17)$$

Where:
$F_{Down}$=axial downward force on Ouput Ring
$F_{NG}$=gear tooth normal reactive force
$\mu_{SG}$=static coefficient of friction between teeth of Output Ring and teeth of Top Planet Half
$\theta$=helix angle of gear teeth
Which results in a torque on each sprung planet top half 216. In other words:

$$F_{NG} \cos(\theta) R_G = T \quad (18)$$

But, this torque is countered by the stem 222, so we find:

$$T = R_1 F_{NS} \sin(\phi) + R_1 F_{NS}\mu_{S1} \cos(\phi) \quad (19)$$

Where:
$F_{NS}$ normal force between splined contact surfaces
$R_1$=length (sample)
$\phi$=angle (sample)
Or:

$$T = R_1 F_{NS}[\sin(\phi) + \mu_{S1} \cos(\phi)] \quad (20)$$

Using eq. (14) to eliminate $F_{NG}$ we get:

$$F_{Down} = \frac{T[\sin(\theta) + \mu_{SG}\cos(\theta)]}{\cos(\theta) R_G} \quad (21)$$

and using eq. (16) with eq. (17) to eliminate T we get:

$$F_{Down} = \frac{R_1 F_{NS}[\sin(\phi) + \mu_{S1}\cos(\phi)][\sin(\theta) + \mu_{SG}\cos(\theta)]}{R_G \cos(\theta)} \quad (22)$$

or:

$$F_{Down} = F_{NS}\left(\frac{R_1}{R_G}\right)\frac{[\sin(\phi) + \mu_{S1}\cos(\phi)][\sin(\theta) + \mu_{SG}\cos(\theta)]}{\cos(\theta)} \quad (23)$$

we know that when:

$$F_{Down} \leq \mu_{S1}F_{NS}(\text{system locks \& holds}) \quad (24)$$

For typical solid lubricants (such as on gear teeth)

$$\mu_{SG} \leq 0.15 \text{ (solid lubrication)} \quad (25)$$

And from FIG. 14, we measure:

$$\frac{R_1}{R_G} = \frac{3}{5.5} \text{ (from FIG. 14)} \quad (26)$$

And:

$$\theta = 15°; \phi = 15° \quad (27)$$

Substituting eq. (19) into eq. (20), we get $$\frac{F_{Down}}{F_{NS}} \leq \mu_{S1} \quad (28)$$
$$= \left(\frac{R_1}{R_G}\right)\frac{[\sin(\phi) + \mu_{S1}\cos(\phi)][\sin(\theta) + \mu_{SG}\cos(\theta)]}{\cos(\theta)}$$

Which (when substituting values given in eq. (22) and eq. (23)) we get:

$$\mu_{S1} = 0.2279723[\sin(\phi) + \mu_{S1}\cos(\phi)] \quad (29)$$

Rearranging eq. (25) we have:

$$\mu_{S1} = \frac{0.2279723\sin(\phi)}{[1 - 0.2279723\cos(\phi)]} = 0.07566543 \quad (30)$$

So if: $\mu_{S1} \geq 0.07566543$ then the system locks.

Strength of the planet stems 222 in withstanding torque is now examined.

The torque the stem 222 must withstand, by way of example, is:

$$F_{NS}\frac{\pi(D)^3 58(E3)(0.6)}{(16)(12)} = T_{Max}(\text{ft-lbs.}) \quad (31)$$

where:
D=Stem Dia. (in.)
58 (E3) Yield Strength of Steel (2/1 safety factor)
0.6=Shear Factor $$\text{Choose } D = \frac{3}{16} \text{ in.}$$

This calculates to the values:

$$T = 3.753459 \text{ ft.-lbs. per planet} \quad (32)$$
$$= 11.26038 \text{ ft.-lbs. for 3 planets}$$

$$F_{NG}\cos(\theta) = \frac{T}{R_G} = F_G; \text{ where: } \theta = 15° (\text{from FIG. 17}) \quad (33)$$

$$R_G = \frac{5.5}{3}\left(\frac{3}{32}\right) \text{ in.(from FIGS. 14, 17)} = 0.171875 \text{ in.} \quad (34)$$

Which calculates to:

$$F_{NG} = 271.3041 \text{ lbf. per planet} \quad (35)$$

and:

$$F_G = 262.05971 \text{ lbf. per planet} \quad (36)$$

From FIG. 13, and because we have at least three planets at work at any time in the anti-backlash mode, we have:

$$3F_G\left(\frac{D_{System}}{2}\right)\left(\frac{1}{12}\right) = T_{TMax} \quad (37)$$

where we choose:

$$D_{System} = 1.25 \text{ in.}$$

Thus, from eqs. (32) and (33), we have:

$$T_{Trans} = 32.75746 \text{ ft.-lbs.Max} \quad (38)$$

From FIGS. 14 and 15, and because at least three planets are performing the axial load-bearing function at any one time, we have:

$$F_{Axial\,Bearing} = 3F_{NG}[\sin(\theta) + \mu_{SG}\cos(\theta)] \quad (39)$$

which results in:

$$F_{Axial\,Bearing} = 327.3717 \text{ lbs.}(\mu_{SG} = 0.15) \quad (40)$$
$$= 249.9649 \text{ lbs.}(\mu_{SG} = 0.05)$$

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. An anti-backlash speed reduction system having both gear and bearing characteristics, the system including:
   a first gear bearing having a first central axis and including a first plurality of gear teeth extending radially outward from the first central axis, each first gear tooth having a first discrete contact point for contacting a mating gear tooth of a mating gear, said first contact point disposed a first distance from the first central axis,
   a first roll surface element including a second discrete contact point for contacting said mating gear, wherein the second discrete contact point is also disposed substantially the first distance from the first central axis, and
   wherein the first gear bearing comprises top and bottom halves, each half of which can slide linearly with respect to each other and is biased apart from each other and the top and bottom halves are restrained from rotating with respect to each other, and the top and bottom halves have separate sets of gear teeth phase shifted out of phase with respect to each other.

2. An anti-backlash speed reduction system having both gear and bearing characteristics, the system including:
   a first gear bearing having a first central axis and including a first plurality of gear teeth extending radially outward from the first central axis, each first gear tooth having a first contact point disposed a first distance from the first central axis, a first roll surface element including a second contact point, wherein the second contact point is also disposed substantially the first distance from the first central axis, and wherein the first gear bearing comprises top and bottom halves, each half of which is biased against each other and the top and bottom halves can slide linearly with respect to each other; and wherein the top half of the first gear bearing includes an interior surface, and the bottom half of the first gear bearing comprises a stem which includes an outer surface, and wherein the outer surface of the stem contacts the interior surface of the top half of the first gear bearing such that the top and bottom halves can slide axially with respect to each other.

3. An anti-backlash speed reduction system according to the limitations of claim 1, wherein the top half of the first gear bearing is biased apart from the bottom half of the first gear bearing by a biasing mechanism.

4. An anti-backlash speed reduction system according to the limitations of claim 3, wherein the biasing mechanism comprises back-to-back Belleville washers.

5. An anti-backlash speed reduction system according to the limitations of claim 2, wherein the interior surface of the top half forms a hexagon, and the outer surface of the stem forms a modified hexagon, such that the top and bottom halves are restrained from rotating with respect to each other.

6. An anti-backlash speed reduction system having both gear and bearing characteristics, the system including:

a first gear bearing having a first central axis and including a first plurality of gear teeth extending radially outward from the first central axis, each first gear tooth having a first discrete contact point for contacting a mating gear tooth of a mating gear, said first contact point disposed a first distance from the first central axis, a first roll surface element including a second discrete contact point for contacting said mating gear, wherein the second discrete contact point is also disposed substantially the first distance from the first central axis, wherein the first gear bearing comprises top and bottom halves, each half of which is biased apart from each other; and wherein said first plurality of teeth further comprises a first crowned surface having an apogee defining a third discrete contact point for contacting said mating gear, wherein the third discrete contact point is also disposed substantially the first distance from the first central axis.

7. An anti-backlash speed reduction system according to the limitations of claim 6, wherein the first gear bearing is rotated about the first central axis whereby the first, second and third discrete contact points have substantially equal instantaneous linear speeds.

8. An anti-backlash speed reduction system having both gear and bearing characteristics, the system including:

a first gear bearing having a first central axis and including a first plurality of gear teeth extending radially outward from the first central axis, each first gear tooth having a first discrete contact point for contacting a mating gear tooth of a mating gear, said first contact point disposed a first distance from the first central axis, a first roll surface element including a second discrete contact point for contacting said mating gear, wherein the second discrete contact point is also disposed substantially the first distance from the first central axis, wherein the first gear bearing comprises top and bottom halves, each half of which is biased apart from each other; and wherein the first gear bearing is a planet gear bearing in a planetary gear bearing transmission, the transmission comprising a ground ring gear bearing and an output ring gear bearing, both of which engage the first gear bearing.

9. An anti-backlash speed reduction system according to the limitations of claim 8, wherein the transmission further comprises a sun gear bearing which engages the first gear bearing.

10. An anti-backlash speed reduction system according to the limitations of claim 9, wherein the transmission further includes at least three planet gear bearings substantially identical to the first gear bearing.

11. An anti-backlash speed reduction system having both gear and bearing characteristics, the system including:

a first gear bearing having a first central axis and including a first plurality of gear teeth extending radially outward from the first central axis, each first gear tooth having a first contact point disposed a first distance from the first central axis, a first roll surface element including a second contact point, wherein the second contact point is also disposed substantially the first distance from the first central axis, and wherein the first gear bearing comprises top and bottom halves, each half of which is biased against each other, wherein the first gear bearing is a planet gear bearing in a planetary gear bearing transmission, the transmission comprising a ground ring gear bearing and an output ring gear bearing, both of which engage the first gear bearing, the transmission further comprises a sun gear bearing which engages the first gear bearing, the transmission further includes at least three planet gear bearings substantially identical to the first gear bearing; and wherein the transmission further includes at least three second gear bearings, each second gear bearing including a second central axis and also including a second plurality of gear teeth extending radially outward from the second central axis, each second gear tooth having a fourth contact point disposed a second distance from the second central axis, a second roll surface element including a fifth contact point, wherein the fifth contact point is also disposed substantially the second distance from the second central axis.

12. An anti-backlash speed reduction system according to the limitations of claim 11, wherein each of the second gear bearings includes top and bottom halves, the top and bottom halves of each second gear bearing being restrained from sliding linearly with respect to each other.

13. An anti-backlash planetary gear bearing transmission comprising: a sun gear bearing, including a rotating input shaft, a plurality of planet gear bearings, each planet gear bearing engaging the sun gear bearing, and wherein at least three of the planet gear bearings are split planet gear bearings, each of the split planet gear bearings including top and bottom halves, and further including biasing means for forcing apart the top and bottom halves, a ground ring gear bearing, and an output ring gear bearing, including a rotating output shaft, each of the planet gear bearings engaging both the ground ring gear bearing and the output ring gear bearing, wherein the sun gear bearing and each of the planet gear bearings each include a plurality of gear teeth extending radially outward from a central axis, each gear tooth having a first contact point disposed a preset distance from the central axis, a roll surface element including a second contact point, wherein the second contact point is also disposed substantially the same preset distance from the central axis.

14. An anti-backlash planetary gear bearing transmission according to the limitations of claim 13, further including an idler gear bearing to stabilize and stiffen the planet gear bearings from tilting radially.

15. An anti-backlash planetary gear bearing transmission according to the limitations of claim 14, wherein the idler includes a gear that has thinned teeth so as not to interject any significant forces which might interfere with torque transfer and anti-backlash functions of the transmission.

16. An anti-backlash planetary gear bearing transmission according to the limitations of claim 13, wherein the number of planet gear bearings in the transmission is even.

17. An anti-backlash planetary gear bearing transmission according to the limitations of claim 16, wherein half of the planet gear bearings in the transmission are split planet gear bearings and the remaining half are solid planet gear bearings.

18. An anti-backlash planetary gear bearing transmission according to the limitations of claim 17, wherein the planet gear bearings are equally spaced around the sun gear bearing with a split planet gear bearing alternating with each solid planet gear bearing.

19. An anti-backlash planetary gear bearing transmission according to the limitations of claim 18, wherein the number of planet gear bearings in the transmission is six.

20. An anti-backlash planetary gear bearing transmission according to the limitations of claim 13, wherein the top and bottom portions of each of the planet gear bearings have been turned to create serrated bearing surfaces.

21. An anti-backlash planetary gear bearing transmission according to the limitations of claim 13, wherein the top and bottom halves of the split planet gear bearings can slide linearly with respect to each other.

22. An anti-backlash planetary gear bearing transmission according to the limitations of claim 21, wherein the top half of each split planet gear bearing includes an interior surface, and the bottom half of each split planet gear bearing comprises a stem which includes an outer surface, and wherein the outer surface of each stem contacts the interior surface of each top half of the split planet gear bearing such that the top and bottom halves can slide linearly with respect to each other.

23. An anti-backlash planetary gear bearing transmission according to the limitations of claim 13, wherein the number of rotations of the output shaft and the number of rotations of the input shaft are different over a given period of time.

24. An anti-backlash speed reduction system in combination with a mating gear, the system including:
   a first gear bearing having a first central axis and including a first plurality of gear teeth extending radially outward from the first central axis, each first gear tooth having a first discrete contact point for contacting a mating gear tooth of said mating gear, said first contact point disposed a first distance from the first central axis,
   a first roll surface element including a second discrete contact point for contacting said mating gear, wherein the second discrete contact point is also disposed substantially the first distance from the first central axis,
   wherein the first gear bearing comprises top and bottom halves, each half of which is biased apart from each other; and wherein said first roll surface element engages both a roller surface of said mating gear and said mating gear tooth at said first distance from the first central axis.

25. The system according to claim 6 in combination with said mating gear, wherein said first roll surface element engages both a roller surface of said mating gear and said mating gear tooth at said first distance from the first central axis and said third discrete contact point of said crowed surface engages a corresponding roller element of said mating gear.

26. The system according to claim 1, wherein said separate sets of gear teeth are beveled.

27. The system according to claim 7 in combination with said mating gear, wherein said first roll surface element engages both a roller surface of said mating gear and said mating gear tooth at said first distance from the first central axis and said third discrete contact point of said crowed surface engages a corresponding roller element of said mating gear.

* * * * *